(12) United States Patent
Gohar

(10) Patent No.: US 12,496,955 B2
(45) Date of Patent: Dec. 16, 2025

(54) RETRACTABLE, SPACE-SAVING TRAILER TONGUE

(71) Applicant: Shaddi Gohar, Rancho Cucamonga, CA (US)

(72) Inventor: Shaddi Gohar, Rancho Cucamonga, CA (US)

( * ) Notice: Subject to any disclaimer, the term of this patent is extended or adjusted under 35 U.S.C. 154(b) by 457 days.

(21) Appl. No.: 18/204,368

(22) Filed: May 31, 2023

(65) Prior Publication Data
US 2023/0391150 A1 Dec. 7, 2023

Related U.S. Application Data

(60) Provisional application No. 63/348,912, filed on Jun. 3, 2022.

(51) Int. Cl.
*B60P 3/34* (2006.01)
*B60P 3/36* (2006.01)

(52) U.S. Cl.
CPC .. *B60P 3/34* (2013.01); *B60P 3/36* (2013.01)

(58) Field of Classification Search
CPC ......... B60D 1/167; B60D 1/1675; B60P 3/34; B60P 3/36; B62D 63/061
(Continued)

(56) References Cited

U.S. PATENT DOCUMENTS 2,664,039 A * 12/1953 Heckathorn ........... A01B 63/26
172/507
3,582,131 A * 6/1971 Brown ....................... B60P 3/34
296/26.02
(Continued)

FOREIGN PATENT DOCUMENTS

| ES | 2839078 T3 | 7/2021 |
|---|---|---|
| WO | 2004045876 A1 | 6/2004 |
| WO | 2012070948 A1 | 5/2012 |

*Primary Examiner* — Christopher B Wehrly
(74) *Attorney, Agent, or Firm* — Kenneth Avila

(57) ABSTRACT

The tongue is triangular and comprises four elements, the first three elements comprise the triangle previously discussed, and the fourth element is a rectangular center pole that bisects the triangle. The first element, referred to as the base element, is permanently attached to the chassis of the trailer much as the base element of prior art tongues are also attached to the chassis of the trailer. The second and third elements comprise the legs of the triangle and they are mirror images of each other. The fourth element is the center pole. The center pole bisects the triangle and is composed of two segments. The proximal segment, being rectangular and tubular, is permanently attached to the base element. Within the proximal segment's hollow tubular part, the distal segment linearly moves inwardly and outwardly. At the far end of the center pole's distal segment is a coupler, the coupler is configured to receive the towing vehicle's trailer ball. The coupler is also configured to releasably receive first and second element's second segment as second segment may be swung towards the coupler and attached to the coupler by a pin or by a latch. As the center pole's distal segment traverses within the center pole's first part, its position may be fixed by using a pin or latch. This novelty allows the conservation of garageability without sacrificing cabin space to accomplish the maximum length. Instead, the tongue retracts to save that length in a more creative and effective manner. The information provided and listed above solely provides embodiments and does not limit the extent of this novelty.

9 Claims, 20 Drawing Sheets

(58) Field of Classification Search
USPC .................................. 280/491.3, 491.4, 656
See application file for complete search history.

(56) References Cited

U.S. PATENT DOCUMENTS

| | | | | |
|---|---|---|---|---|
| 4,013,303 | A | | 3/1977 | Milner |
| 4,577,883 | A | * | 3/1986 | Duncan .................. B60D 1/155 |
| | | | | 280/491.4 |
| 4,714,265 | A | * | 12/1987 | Franklin .................. B60D 1/40 |
| | | | | 280/491.4 |
| 4,887,838 | A | * | 12/1989 | Reppen .................. E01H 5/066 |
| | | | | 254/102 |
| 5,000,473 | A | | 3/1991 | Johnson |
| 5,873,595 | A | * | 2/1999 | Hinte ...................... B60D 1/02 |
| | | | | 280/495 |
| 6,428,035 | B1 | * | 8/2002 | Maxwell .............. B62D 63/061 |
| | | | | 280/789 |
| 6,834,882 | B1 | * | 12/2004 | Boyd ...................... B60P 3/122 |
| | | | | 280/789 |
| RE38,751 | E | * | 7/2005 | Davis ...................... B60D 1/54 |
| | | | | 280/491.4 |
| 7,654,609 | B1 | * | 2/2010 | McNutt .................... B60P 3/07 |
| | | | | 280/789 |
| 7,976,029 | B2 | * | 7/2011 | Plummer ............. B60G 17/017 |
| | | | | 280/6.151 |
| 9,527,355 | B1 | | 12/2016 | Blevins |
| 10,752,306 | B2 | | 8/2020 | Nordstrom |
| 11,242,099 | B1 | * | 2/2022 | Jury ..................... B62D 63/061 |
| 2003/0127827 | A1 | | 7/2003 | Hulsey et al. |
| 2006/0284397 | A1 | * | 12/2006 | Lambert ................ B62D 21/20 |
| | | | | 280/491.1 |
| 2007/0145718 | A1 | | 6/2007 | Winter et al. |
| 2007/0262562 | A1 | | 11/2007 | Senatore |
| 2012/0001403 | A1 | | 1/2012 | Wydner |
| 2013/0140848 | A1 | * | 6/2013 | Shanley ................... B60P 3/34 |
| | | | | 296/172 |
| 2014/0145416 | A1 | * | 5/2014 | Fincher .................... B60D 1/02 |
| | | | | 280/515 |
| 2014/0265241 | A1 | | 9/2014 | Korhonen et al. |
| 2014/0333046 | A1 | * | 11/2014 | Olsen .................. B60D 1/1675 |
| | | | | 280/477 |
| 2017/0217519 | A1 | * | 8/2017 | Bjorkman ............... B62B 19/04 |
| 2020/0324653 | A1 | * | 10/2020 | Breen ..................... B60L 58/12 |
| 2020/0346700 | A1 | | 11/2020 | Nordstrom |
| 2021/0323489 | A1 | * | 10/2021 | Blanco Schierling .. B60R 15/02 |
| 2023/0064854 | A1 | * | 3/2023 | Zgrablic .............. B60D 1/1675 |
| 2024/0336096 | A1 | * | 10/2024 | Van De Loo ............ B60D 1/06 |

* cited by examiner

RETRACTABLE, SPACE-SAVING TRAILER TONGUE

CROSS-REFERENCE TO RELATED APPLICATION

This application claims priority from U.S. provisional patent application No. 63/348,912 filed on Jun. 3, 2022. The entire disclosure of the prior application is considered to be part of the disclosure of the accompanying application and is hereby incorporated by reference.

FIELD OF INVENTION

The present invention relates to the towable trailer industry. More specifically, the present invention relates to the tongue structure used to tow the trailer.

BACKGROUND

Adventure camping using an enclosed vehicle to sleep in and store the goods of the individual has been heavily present in the past 50 years. The way in which people camp has been unchanged and non-innovative for a long period of time. There have been occasional trials in which a collapsible camper, mostly fabric, will make its way into the industry and succeed, but never a hard-sided variant.

There are many drawbacks to owning a large motorhome, whether it be a Class C, Fifth-wheel, or even a travel trailer. The first of those drawbacks being size and efficiency. While being towed, large motorhomes are aerodynamically inefficient in both stability and fuel. The larger a towable is, the more unstable it is on the road at higher speeds. Moreover, the greater the surface area that air comes in contact with, the harder the towing vehicle has to work to tow; thus creating the fuel inefficiency.

Another drawback to owning a larger vehicle is the storability. While most homes come equipped with a garage, a very small percentage are equipped with RV parking. This creates the tedious task of finding storage for the vehicle. Storing the vehicle at a facility causes susceptibility to numerous problems. The first being price, storing an RV is very expensive, being upwards of $300/month. The second problem is the weathering of an expensive vehicle parked outside. Another problem with storing an RV in a storage facility is the distance that storage is from home. Loading up and preparing for a trip is much more difficult when the vehicle is far away.

The inefficiencies of a larger motorhome carry on in aspects such as maneuverability, flexibility, maintenance, and cost to own. Smaller overland RVs are easier to maneuver than larger motorhomes, especially in tight spaces such as campsites and parking lots. A smaller overland RV can go places that a larger motorhome cannot, such as narrow roads and winding mountain trails. This provides more flexibility in terms of travel destinations. Smaller RVs require less maintenance than larger motorhomes, as they have fewer moving parts and systems. This can save you both time and money in the long run. Smaller overland RVs are generally less expensive to purchase than larger motorhomes, and they also have lower ongoing costs such as insurance and registration fees. This makes them a more affordable option for those looking to travel on a budget.

While a smaller vehicle reduces the problems from a larger motorhome, a lot is compromised in the meantime. The capacity that a larger vehicle has is far superior. Meaning that the number of people that the vehicle can sleep will significantly decrease with a smaller RV. And even with a smaller unit, the vehicle almost always will never fit in a garage, meaning that the issues are not solved.

This, then, created the market for a collapsible, garageable, travel trailer that can be expanded upon arrival to the destination. The problem with the current options of collapsible trailers is that most of them do not have solid walls or they do not offer accessibility while collapsed. Therefore a need for a solid-sided, collapsible, storable, efficient, and large unit was created in the market.

Hard-sided trailers are much superior to the soft-sided versions because they serve better in various situations. A hard-sided trailer fairs better in terms of intercepted lighting and see-through fabric material. The hard-sided wall also provides additional protection against weathers, elements, and wildlife. Having a hard-sided contraption also aids in the increased durability of the trailer.

BRIEF SUMMARY OF THE INVENTION

The novel invention fills the gaps that the previously mentioned designs don't. It is a travel trailer that can be collapsed in order to clear clearance for an average-sized garage. This solves the issues presented with an uncollapsed travel trailer. The trailer now has the ability to be stored in a garage. The trailer now also solves the inefficiencies of size and aerodynamics discussed earlier as well. At full height, the trailer meets and often exceeds the height standards of the market. The trailer maintains all the desirable characteristics in traditional travel trailers. It is made up of a solid shell structure, negating the argument of weak collapsibility. In terms of its mechanism, the roof is raised vertically using electronically operated actuators, instead of traditional hydraulics. While the roof is raised linearly, the walls automatically lift with the roof, leaving no need for manual labor. The trailer operates like a packaged box; unfolding the sides outwardly from a parted, inward position. The front and back walls also fold out from an inward position after resting on the side walls. There are novelties in the designs in the doors utilized in the trailer. The trailer also carries the theme of dual-access storage throughout. Many utilities and storage compartments are accessible from both inside and outside the trailer. The increased accessibility of the trailer in its collapsed format adds to the convenience of stocking for a camping trip while remaining collapsed and stored in the garage.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
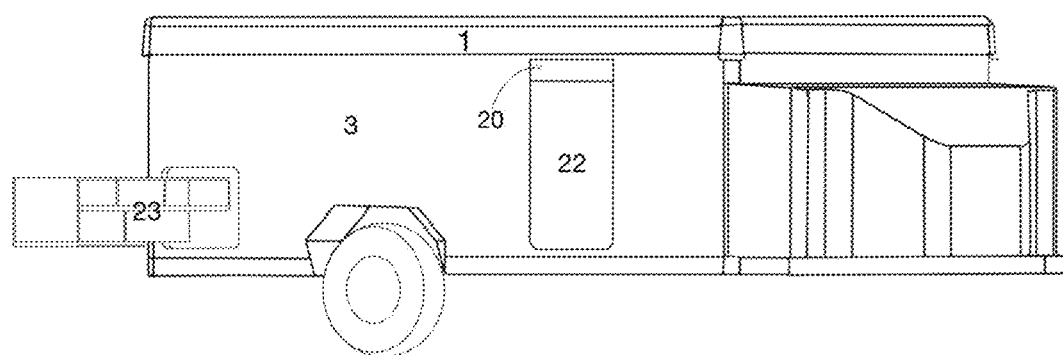
FIG. 1 depicts an example of the trailer in its collapsed form with little to no details from a front-left perspective. The figure is aimed at highlighting the basic structure and design of the trailer in its collapsed form.

The terminology used herein is for the purpose of describing particular embodiments only and is not intended to be limiting of the invention. As used herein, the term "and/or" includes any and all combinations of one or more of the associated items. As used herein, the singular forms "a," "an," and "the" are intended to include the plural forms as well as the singular forms, unless the context clearly indicates otherwise. It will be further understood that the term "comprises" and/or "comprising," when used in this specification, specify the presence of state features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless otherwise expressed herein.

New concepts and themes for collapsible trailers, components, and methods for collapsing travel trailers are discussed herein. In the following description, for purposes of explanation, numerous specific details are set forth in order to provide a thorough understanding of the present invention. It will be evident, however, to one skilled in the art that the present invention may be practiced without these specific details. The terms hard-sided, solid-walls, solid-sided, etc. are interchangeable throughout the text.

The words that will be used in the following paragraphs that require defining are "collapsible," "hard-sided," "accessible," and the terms "storable" or "garageable." The term collapsible refers to the ability of the trailer to be folded in a manner that makes it more convenient. The term hard-sided refers to the make-up of the structure, being completely rigid. The term accessible refers to the multi-access points in which a compartment/panel/etc can be used from. Furthermore, this term accessible means that storage compartments/panels/etc of the recreational vehicle can be accessible from outside when the recreational vehicle is collapsed in its retracted position and accessible from both inside and outside when the recreational vehicle is fully extended. The term garageable refers the feasibility in which the trailer can be stored and kept due to the collapsibility in size. Moreover, this term garageable means that said recreational vehicle can be stored inside a home garage when collapsed in its retracted position. Finally, the following terms and their various forms are interchangeable with each other: collapse and retract, uncollapse and extend, garageable and storable.

Garageability can be a major selling point in the collapsible trailer industry. The ability for a travel trailer to be kept in the garage proves beneficial for a plethora of reasons. First of all, convenience. With a garageable travel trailer, you have the convenience of being able to store it at home. This eliminates the need to rent a storage space, which can save you time and money. You can easily access your trailer whenever you need it, without having to drive to a remote location. Second, the easy-access of the trailer. With your travel trailer stored in your garage, you have easy access to it whenever you need it. You don't have to worry about making arrangements to pick up your trailer from a remote storage facility.

Thirdly, security; storing your travel trailer in your garage provides an added layer of security, protecting it from theft and vandalism. You can install locks and security cameras to further increase the security of your trailer. Additionally, the ability for the trailer to be stored indoors in a garage helps protect it from the elements, preventing damage from sun exposure, wind, rain, and other environmental factors. This can help prolong the life of your trailer and reduce the need for repairs. Garaging your trailer also increases privacy. Storing your trailer at home ensures your privacy. Unlike when renting a storage space where other people have access to your trailer, storing it in your garage provides added privacy and security. Lastly, garageability helps increase a trailer's lifespan. It protects it from wear and tear, reduces the need for repairs or replacements, and helps maintain its value over time. This can save you money in the long run and ensure that you get the most out of your investment.

Due to the collapsible nature of the trailer, many advantages are gained. In the area of stocking and destocking, the trailer may remain inside the garage. This means that the owner may gain the advantage of stocking and destocking in an air conditioned or heated atmosphere, depending on the outdoor weather conditions. Another advantage gained from the collapsibility during the stocking and destocking phases of the trip, is that the trailer may remain hidden inside the garage for a discreet departure from home. Another advantage of the collapsibility is the increased aerodynamics and stability. Due to less wind resistance, there is an increase in aerodynamics and a decrease in drag. This then decreases the consumption of energy due to less effort needed from the towing car to move the trailer. It also creates stability in driving due to less lateral movement from wind or any external forces. It also increases safety for cars behind, due to a cleared visual field.

Another important element of the trailer is that it is hard-sided. Most examples of collapsible trailers in the industry fail due to a fabric or synthetic material used instead of a rigid composite. Due to the rigid material, the trailer is protected against many elements. In hot or cold weather, the trailer is protected and isolated from any external environments. It also fairs best in rain, snow, or dust storms due to the protection against the elements. In addition to protection from the elements, the hard-sided nature of the trailer increases sound and light insulation. The fabric or synthetic counterparts decrease said insulation due to less sound insulation and light protection because of a thin border of walls. The hard-sided walls also create a level of privacy that the soft-sided counterparts cannot match.

Specifically, hard-sided trailers are superior to fabric examples due to their durability, insulation, security, maintenance, and resale value. Hard-sided travel trailers are made of sturdy materials such as aluminum or fiberglass, which provide more protection against weather and wear and tear than fabric trailers. Hard-sided trailers offer better insulation than fabric trailers, which can help keep the interior temperature comfortable in both hot and cold weather. Hard-sided trailers are more secure than fabric trailers, as they have lockable doors and windows, making it more difficult for intruders to enter. Hard-sided trailers require less maintenance than fabric trailers, as they are less susceptible to rips, tears, and other damage. This can save you time and money in the long run. Lastly, Hard-sided trailers generally have a higher resale value than fabric trailers, as they tend to hold up better over time. This can be beneficial if you decide to sell your trailer in the future.

The third characteristic of the trailer that differentiates it from others is the accessibility it creates. Throughout the trailer, there are many components that are designed to be used from both inside and outside of the trailer or designed to increase the convenience of stocking and destocking the trailer. The novel accessibility factor builds off of the collapsibility of the trailer due to the fact that the trailer's accessibility is unphased when the trailer is collapsed or uncollapsed. Before the beginning of a trip, the trailer may remain collapsed and the supplies needed for the trip may be stocked and put into the trailer from the exterior and can be later accessed from the interior of the trailer upon arrival at the destination.

The last and equally important characteristic of the trailer is the storability aspect of the trailer. The trailer, due to its compact nature during its collapsed version, creates an unmatched storability. Due to its collapsed capability and a foldable tongue, the trailer is storable in an average sized garage. Due to the avoidance of weathering and elements, the indoor storage increases the lifespan of the trailer. The feature of remaining inside the house is that it acts as a survival unit, remaining close to home and ready for departure in the event of an emergency evacuation. Due to the in-home feature of the trailer, the trailer acts as an extension of storage to the home, keeping all camping and outdoor necessities accessible for home-use while remaining ready for departure.

Throughout all current examples in the market, none possess the combination and cohesive nature that our novel invention does. The unmatched chemistry of collapsibility, rigidity, accessibility, and storability creates a machine that does not falter in any usage needed for survival, recreation, or luxury.

The present disclosure is to be considered as an exemplification of the invention, and is not intended to limit the invention to the specific embodiments illustrated by the figures or description below.

A key requirement of the novel towable trailer of the present disclosure is the ability to be stored in a garage. Trailers are, for the most part, in storage awaiting use and can be damaged when exposed to temperature extremes, ultraviolet radiation from the sun, hail, and other adverse weather conditions; may be vandalized or stolen; or suffer a multitude of other harms. Many times, a trailer may have to be stored at an off-site storage facility resulting in a monthly fee that adds up over time. Therefore, it is beneficial, at many levels, to store a trailer within a home garage. However, reducing the size of a trailer so that it may be stored within a home garage can compromise the functionality of the trailer as features must be traded off for compactness. One part of the trailer that has a larger footprint but would not impact functionality of the trailer if altered is the tongue, also known as the trailer hitch, used for towing the trailer.

Traditionally, the tongue of a trailer is broadly in the shape of an equilateral or isosceles triangle. The base of the triangle would be attached to the chassis while the apex of the triangle would support the hitch. Tongues with longer legs for the triangle are stronger than tongues with shorter legs because longer legs utilize the metal's tensile strength while shorter legs utilize the metal's weaker shear resistance strength. However, trailers that have tongues with longer legs are more difficult to store in a garage. This disclosure presents a novel tongue that makes effective use of the tongue's tensile strength while allowing the tongue to collapse so that it is easier for the trailer to be stored in a garage. The space saved by collapsing the tongue assembly may be taken advantage of in either of two ways. First the amount of living space within the trailer may be increased by the amount of space saved when the tongue assembly is collapsed without impacting the overall length of the novel trailer and its garageability. Conversely, by collapsing the tongue assembly the overall length of the novel trailer may be decreased and thereby allowing the novel trailer to be stored in a smaller space than if the tongue assembly remained in its uncollapsed configuration.

The tongue to be disclosed herein is triangular and comprises four elements, the first three elements comprise the triangle previously discussed, and the fourth element is a rectangular center pole that bisects the triangle. The four elements are described as follows. The first element, referred to as the base element, is permanently attached to the chassis of the trailer much as the base element of prior art tongues are also attached to the chassis of the trailer. The second and third elements comprise the legs of the triangle and they are mirror images of each other. These elements each have two segments. The first segment is permanently attached to the base element, the second element's first segment is attached to the base element at one end of the base element while the third element's first segment is attached to the opposing end of the base element. The second segment is attached to the first segment by means of a hinge and may freely swing about the axis of the hinge. When the second segment is swung so that it is adjacent to the first segment, the tongue is in its retracted or collapsed configuration, shorting the tongue roughly by the length of the second segment. The fourth element is the center pole. The center pole bisects the triangle and is composed of two segments. The proximal segment, being rectangular and tubular, is permanently attached to the base element. Within the proximal segment's hollow tubular part, the distal segment linearly moves inwardly and outwardly. At the far end of the center pole's distal segment is a coupler, the coupler is configured to receive the towing vehicle's trailer ball. The coupler is also configured to releasably receive first and second element's second segment as second segment may be swung towards the coupler and attached to the coupler by a pin or by a latch. As the center pole's distal segment traverses within center pole's first part, its position may be fixed by using a pin or latch.

Another embodiment of the tongue assembly could further comprise one or more support elements to strengthen the tongue assembly. These support elements traverse the center pole by passing through an opening found on a flange that is attached to the center pole's proximal segment. The flange may be formed along the top of the proximal segment or along its bottom. The opposing ends of these support elements are then attached to the second and third elements' first segment. The support elements will strengthen first and second element's first segment resistance against shearing forces.

In yet another embodiment of the tongue assembly, a platform is provided that is suitable for securing cargo that may be carried over the tongue assembly. A tubular frame is formed over the tongue assembly typically having a width of the base element and typically a length of at most the length of the second and third elements' first segment the tubular frame being permanently attached to the tongue assembly. Some surface may then be attached to the tubular frame whereupon cargo may be carried. Hard points are provided on the surface so that the cargo may be securely attached to the tubular frame by means of the surface.

The novel trailer disclosed herein has a tongue assembly used for towing, the tongue assembly having a collapsed configuration and an extended configuration, wherein said trailer comprises a chassis, and wherein said tongue assembly comprises: three rectangular tubular frame elements forming mainly a triangle having: a first frame element being the base of said triangle, attached to said chassis, and having a first end and a second end; a second frame element being a leg of said triangle further comprising a first segment joined to said first frame element's first end, a second segment hingedly joined at one end to said second frame element's first segment; and a third frame element being the other leg of said triangle further comprising a first segment joined to said first frame element's second end, a second segment hingedly joined at one end to said third frame element's first segment; and a center pole element being primarily rectangular and bisecting said triangle, the center pole element comprising: a proximal segment attached to said first frame element and a distal segment configured to be slidable within said proximal segment, comprising a coupler at its distal end configured to receive said second frame element's second segment and said third frame element's second segment; wherein said tongue assembly is in its collapsed configuration when said distal segment is retracted within said proximal segment; said second frame element's second segment is folded against its first segment; and said third frame element's second segment is folded against its first segment; wherein said tongue assembly is in its extended configuration when said distal segment is drawn out from said proximal segment; said second frame element's second segment is folded against said coupler; and said third frame element's second segment is folded against said coupler; and wherein said tongue can be retracted from its extended configuration to its collapsed configuration to reduce storage space.

Where the novel trailer's tongue assembly center pole proximal segment further comprises a flange containing one or more openings to allow one or more rectangular tubular support elements to pass through with one end of said support element being attached to said second frame element while the opposing end of said support element being attached to said third frame element.

Where the novel trailer's tongue assembly further comprises a rectangular tubular structure atop of said frame elements being substantially the width of said first frame element, substantially the length of said second frame element and said third frame element first segments, to support a platform suitable for securing cargo.

Where the novel trailer's tongue assembly three rectangular tubular frame elements forms a triangle that is one of an equilateral triangle and an isosceles triangle.

Where the novel trailer's tongue assembly, being retractable from its extended configuration to its collapsed configuration to reduce storage space, further enables said trailer to have increased interior cabin space while maintaining storability of the trailer in a garage.

Where the novel trailer's tongue assembly, being retractable from its extended configuration to its collapsed configuration to reduce storage space, further enables more space saving as compared to a foldable tongue, wherein said retractable tongue saves storage space more than a foldable tongue due to the thickness of the tongue.

Where the novel trailer's tongue assembly coupler is configured to be hitched to a towing vehicle.

Where the novel trailer's tongue assembly second and third frame element's second segment is releasably secured to its respective first segment by pins or latches when said tongue assembly is in its collapsed configuration.

Where the novel trailer's tongue assembly second and third frame element's second segment is releasably secured to said coupler by pins or latches when said tongue assembly is in its extended configuration.

Where the novel trailer's tongue assembly the position of said distal segment within said proximal segment may be fixed by pins or latches.

Figure 7:
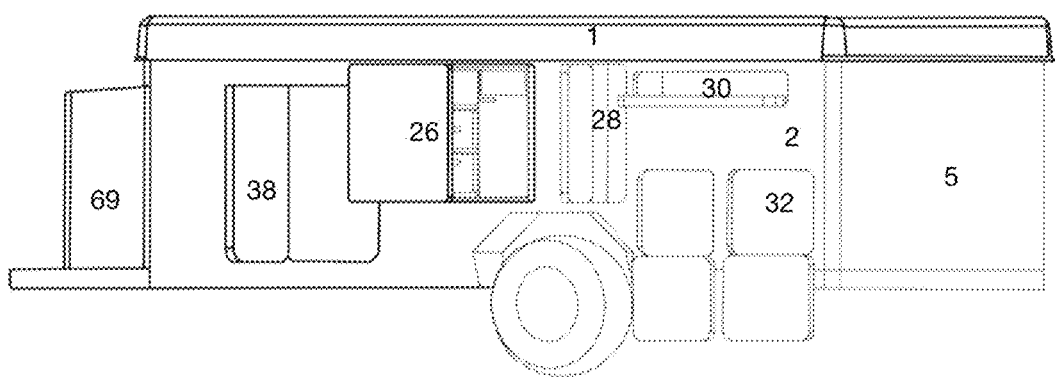
FIG. 7 shows an example of the trailer in its collapsed form with some but not all of its details from a rear-right view. This figure is directed to highlight the trailer in its collapsed form with key features. Key amenities such as the closet and bar area are highlighted in the figure to show full accessibility while the trailer is collapsed.
Figure 8:
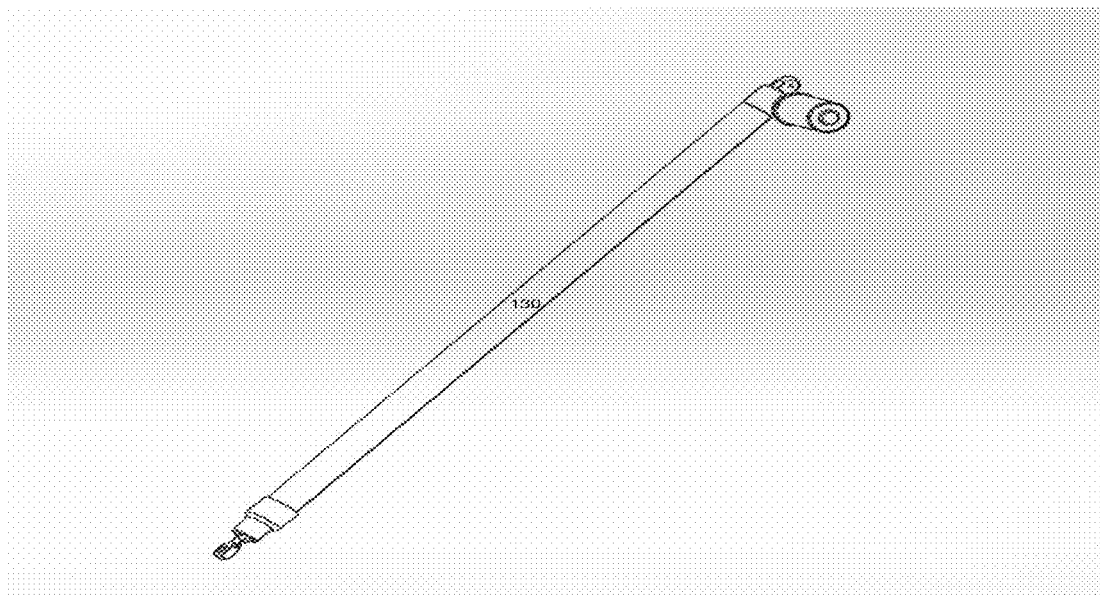
FIG. 8 portrays an example of the actuator used to raise the roof. The purpose of this figure is to show the actuator without any obstruction. The figure shows the actuator in its extended position as it would look inside its housing in the trailer's uncollapsed form.
Figure 9A:
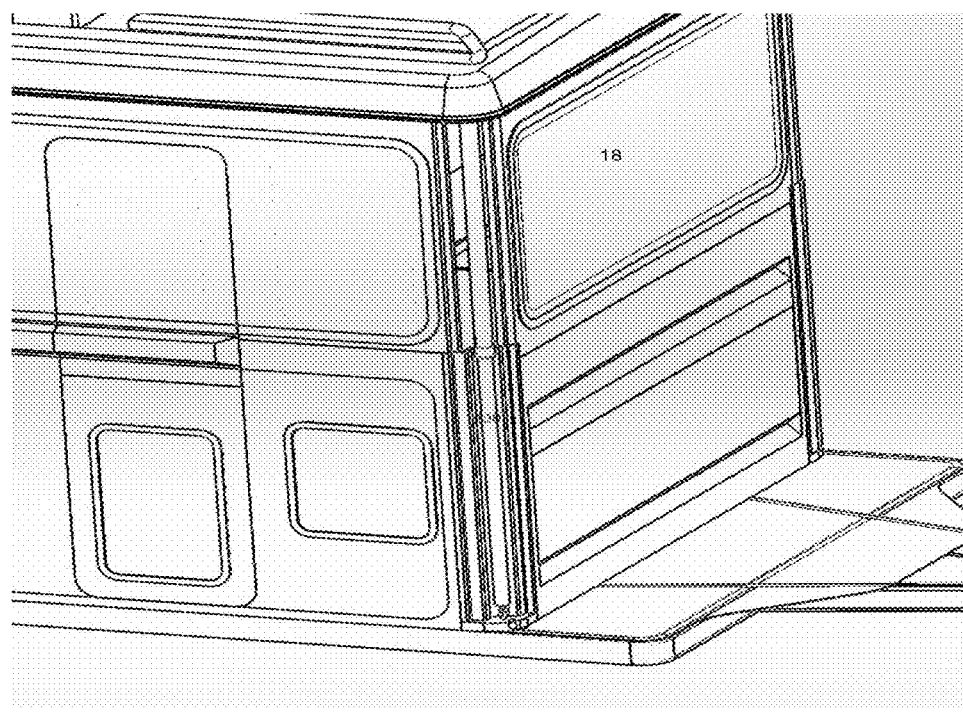
FIG. 9A illustrates an example of the trailer in its uncollapsed form from the front-left view with panel 60 removed for clarity. This figure shows the actuator sitting in its actuator housing with a panel removed to show what the actuator would look like in its expanded form inside of the trailer actuator housing.
Figure 9B:
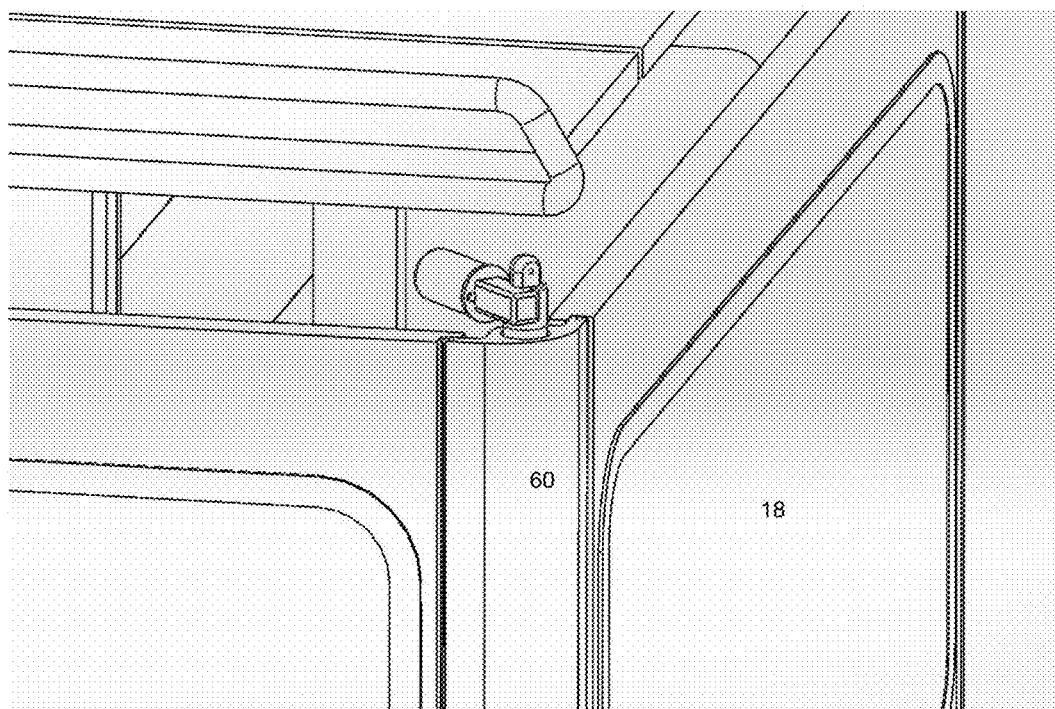
FIG. 9B shows an example of the lifting mechanism extruded from the corner pieces of the trailer. The purpose of this figure is to portray the actuator's positioning and orientation. This highlights the novel use of the actuator upside down.
Figure 9C:
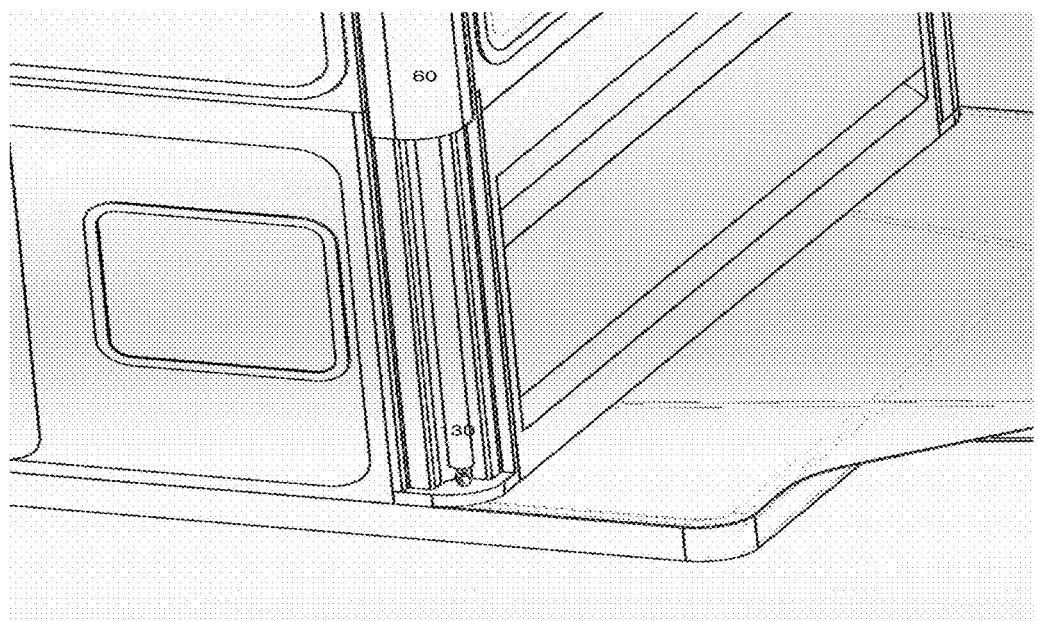
FIG. 9C illustrates an example of the lifting mechanism from a telescoped point of view with the internals of the lifting mechanism being exposed. The purpose of this figure is to depict the function and movement of the actuator in its novel orientation and to show the extended part of the actuator seated in the bottom half of the trailer.
Figure 10:
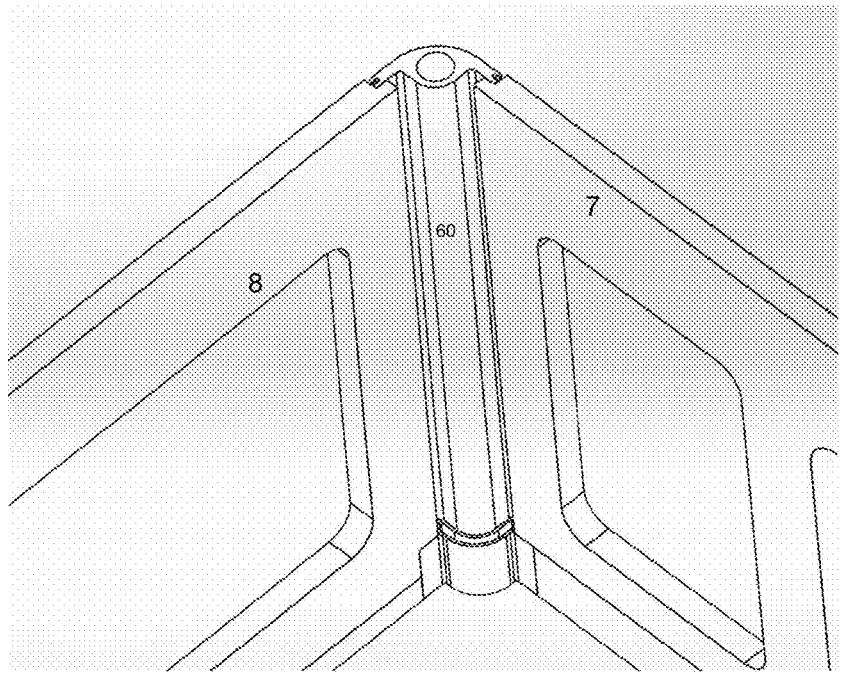
FIG. 10 illustrates an example of the lifting mechanism from a telescoped point of view. This figure illustrates the upper half of the actuator housing from an interior point of view to show the structure and extrusions in which the actuator occupies space in the trailer's interior.

The present invention will now be described using the appended figures representing preferred embodiments. FIG. 7 depicts the trailer in its collapsed form in a non-exploded figure with a few complications. The trailer, containing a single axle, shall be towed in its collapsed form at approximately a 55/45 ratio of lower/upper walls; where 55 measures the ratio of the bottom walls 2, 3 & 4 of the collapsed trailer and the 45 measures the ratio of the top walls 6, 7 & 8 of the uncollapsed version of the trailer. The average garage size encompasses the trailer in its collapsible form.

FIGS. 8, 9A, 9B, & 9C portray the actuator and its encasings to help visualize the movements of the lifting mechanism. The actuator 130 pushes itself and the roof 1 upwards. This means that the bottom half of the encasing of the actuator is immobile. This leaves the actuator working in reverse format, keeping space used and weight needed to a minimum.

Figure 4:
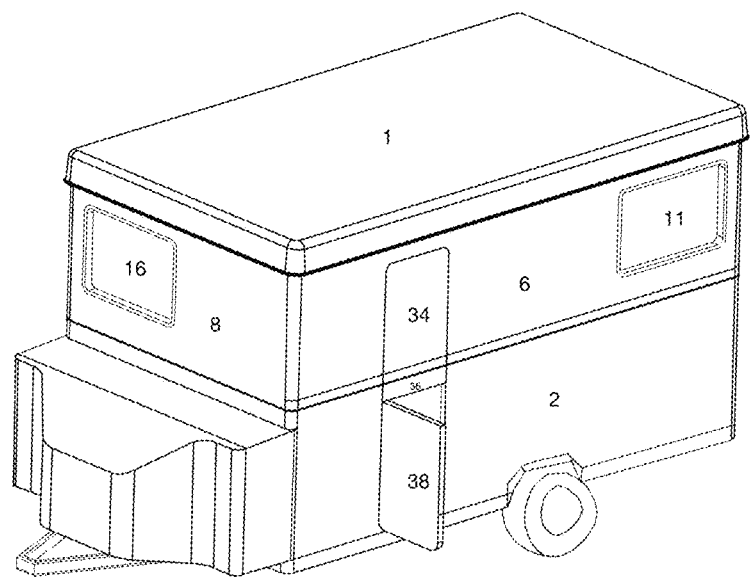
FIG. 4 depicts an example of the trailer in its uncollapsed form with little to no details from a front-right perspective. This figure emphasizes the trailer in its uncollapsed form and also shows a characteristic of the novel door that allows it to open only its bottom half, a useful feature for collapsibility.
Figure 5:
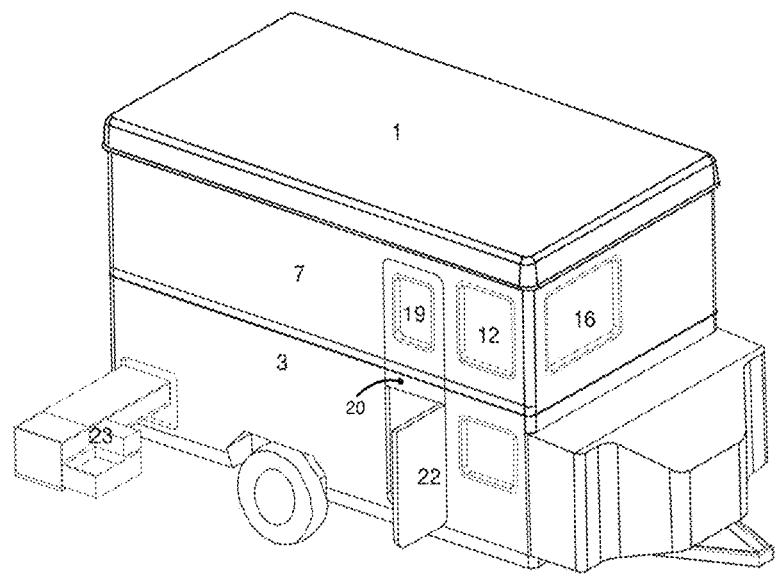
FIG. 5 depicts an example of the trailer in its uncollapsed form with little to no details from a front-left perspective. This figure is aimed at highlighting the uncollapsed nature of the trailer and also highlights the slide-out exterior kitchen.
Figure 6:
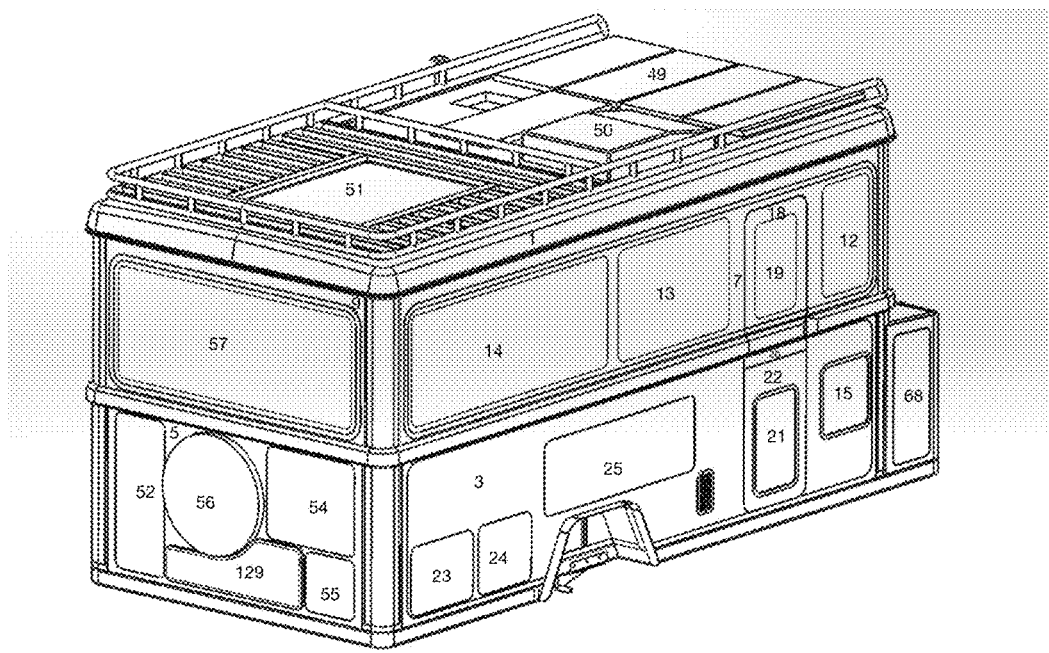
FIG. 6 depicts an example of the trailer in its uncollapsed form with some of the details in the body from a rear-left view. This image is aimed at showing the trailer in more of its complicated nature and closer to its end look.

FIGS. 4 & 5 depicts the trailer in an uncollapsed format to help with the visualization of the following mentioned components. The collapsed and uncollapsed versions of the trailer that will be mentioned in the coming paragraphs will be explained herein. The bottom walls 2, 3, 4, & 5 are fully stationary and are not mobile whatsoever. The top walls 6, 7, 8, & 9 are mobile in a foldable manner. They are hinged to the bottom walls and fold outwards to conjoin with the roof 1 and the bottom walls 2, 3, 4, & 5 at full form. The walls sit in a horizontal laid-down position. The front and back walls 8 & 9 are laid down together under the left and right walls 6 & 7 in a cardboard box manner.

Figure 3A:
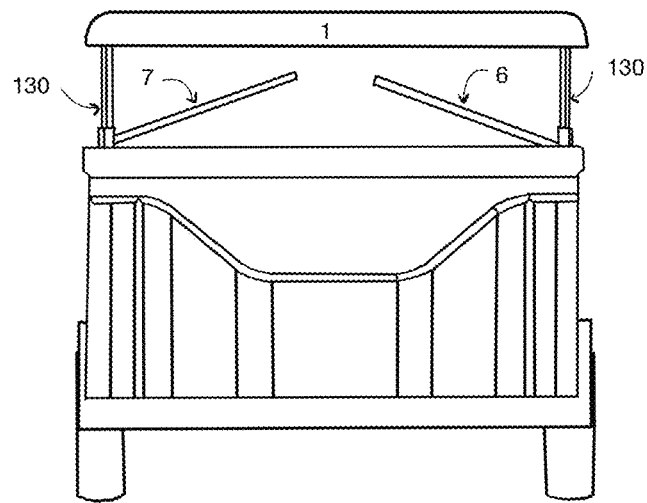
FIG. 3A depicts an example of the trailer with the lifting mechanism at its halfway point of its operation. The purpose of this figure is to portray the lifting mechanism in action and give a sense of perspective to its operation.
Figure 3B:
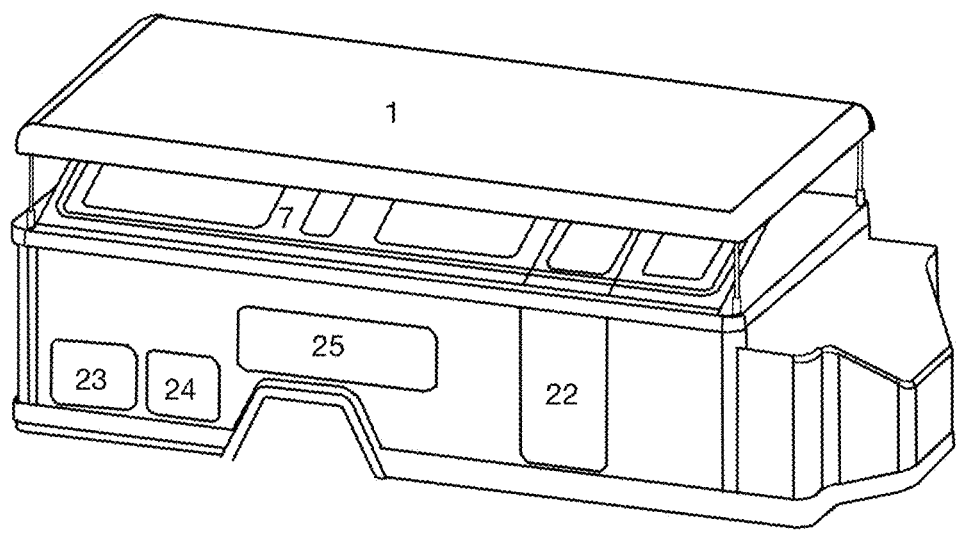
FIG. 3B depicts an example of the trailer with the lifting mechanism at its halfway point of its operation. The purpose of this figure is to portray a side angle of the prior figure and to give a sense of perspective to the operation of the lifting mechanism.

FIGS. 3A & 3B portray the trailer in its halfway point of its collapsing or uncollapsing process. The roof 1 is lifted using a complex lifting mechanism. The lifting mechanism is powered by four linear actuators 130 depicted in FIG. 8. The linear actuator struts lift from inside their housings 60 cooperatively lift the roof 1 upwards. As the roof 1 lifts upwards, the upper walls 6, 7, 8, & 9 lift consequently where the walls lift using upward momentum and thrust from another set of linear actuators. There are linear actuators similar to the one portrayed in FIG. 8 attached to the front, back, and side walls. The actuators will be attached to the lower walls 2, 3, 4, & 5 and upper walls 6, 7, 8, & 9. After the roof 1 is lifted into position, the remaining walls will lift into place automatically. Another embodiment of the lifting mechanism is that there are reels that spool wire connected to the side walls that help lift the side walls into place while the roof is lifting. Another embodiment of the lifting mechanism is that there are tracks in the roof that the walls are connected to in order for the roof to guide the trajectory of the walls into their correct place. Another embodiment is smaller actuators that are installed in various positions throughout the sides of the trailers that assist in the lifting of the sidewalls into the correct positions. Another novelty related to the roof is that there is a skylight 51 inserted on a mobile roof that can be raised and lowered.

Figure 2:
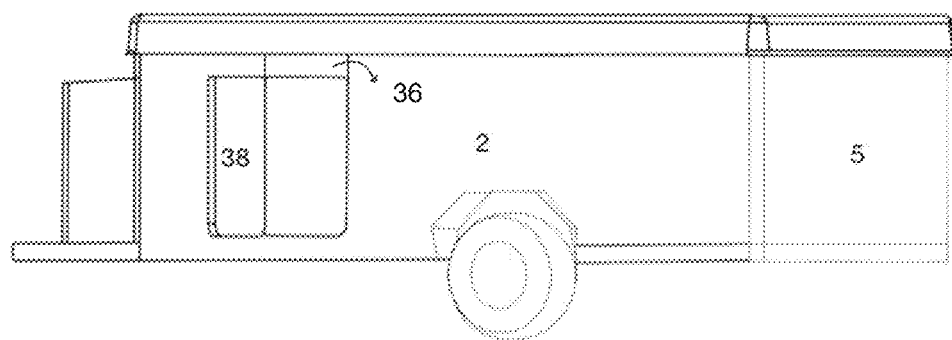
FIG. 2 depicts an example of the trailer in its collapsed form with little to no details from a rear-right perspective. This figure is aimed at highlighting the trailer in its collapsed form from the rear perspective.

FIG. 1 portrays the trailer in its collapsed form where the outer doors 22 are in an openable configuration. FIG. 5 portrays the trailer in an uncollapsed form, allowing the entirety of the door to be openable in the uncollapsed form. There are two identical versions of this door, which can be mentioned uniformly. Each of the two doors contain three components: A top panel 19 & 34. A middle panel 20 & 36. A bottom panel 22 & 38. However, in FIG. 2 shows only the bottom of the three-piece doors 22 & 38 are openable in collapsed form. This presents the novelty of the rigidity of a hard-sided door that has the capability of being opened while the trailer is collapsed. The upper portion of the three-piece door 19 & 34 moves with the top walls 6 & 7 in their natural folding motion while the trailer walls are being folded. The middle portions of the doors 20 & 36 are slithers that are designed to separate the top and bottom panels. This is done in an effort to keep the bottom portion 22 & 38 mobile and openable while the trailer is collapsed. Consequently, the bottom panels 22 & 38 can act independently while the trailer is collapsed to give access to the inside of the trailer while it is collapsed.

FIGS. 7, 12A, 12B, 13, & 15 portray the trailer showing some of the complications in an open format. The travel trailer provides accessibility to various dual-access amenities. These dual-access amenities consist of the dual-access kitchen 25, the closet 26, and the bar area 30 & 31. The dual-accessibility allows for better ergonomics for when tents are using the trailer as a basecamp. This allows stocking to be much easier, being accessible from inside the garage. The outdoor kitchen, indoor dual-access kitchen, bar area, bedding drawers, closet, and water dispenser are all accessible in the collapsed form.

Figure 11:
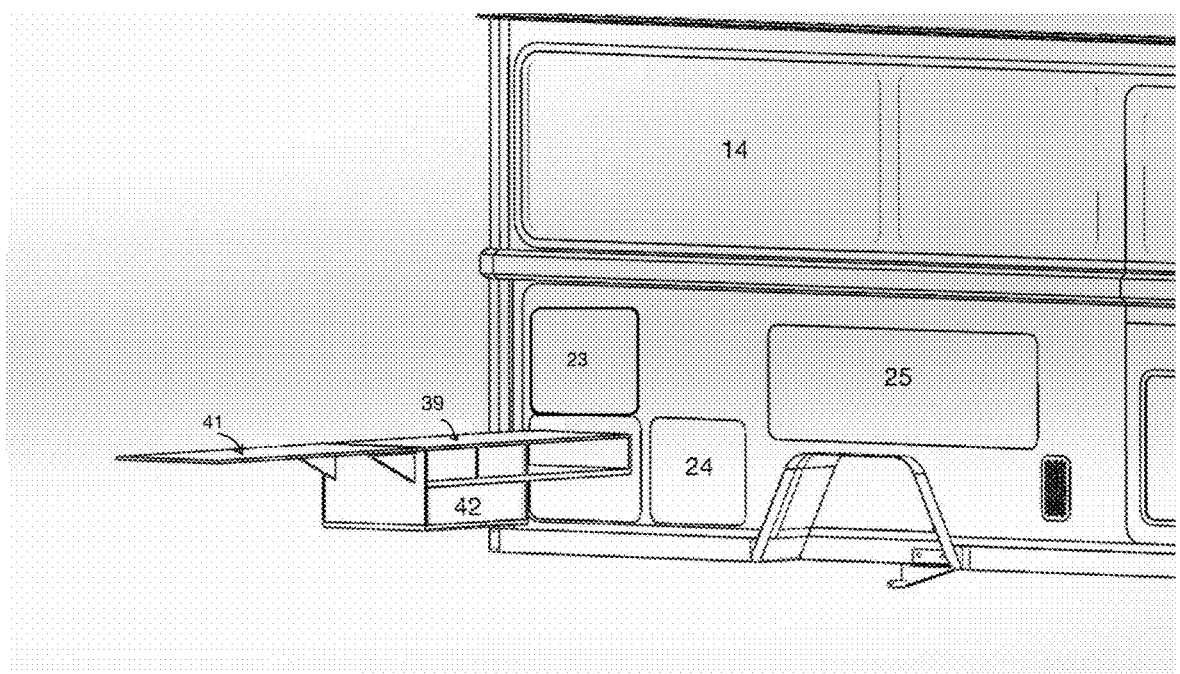
FIG. 11 shows the outdoor kitchen from an exterior point of view. The purpose of this figure is to show the outdoor kitchen and its figure while it is pulled out of the trailer.

FIG. 11 portrays the pull-out kitchen 42 in an open format. The door 23 folds upwards to allow the kitchen to be pulled outwards. The outdoor kitchen 42 is allowed to be pulled out without the trailer being uncollapsed due to the convenient location of the kitchen away from the trailer's folding line. The outdoor kitchen pulls outward in the form of a drawer, housing a foldable countertop 40, a sink 39, and stove 41. The door 23 is repurposed when the kitchen is open to become a backsplash to protect the trailer from any damage from the kitchen's usage. The outdoor kitchen can be pulled out while the trailer is collapsed in order to clean, stock, or even use the kitchen without the need to fully uncollapse the trailer.

Figure 12A:
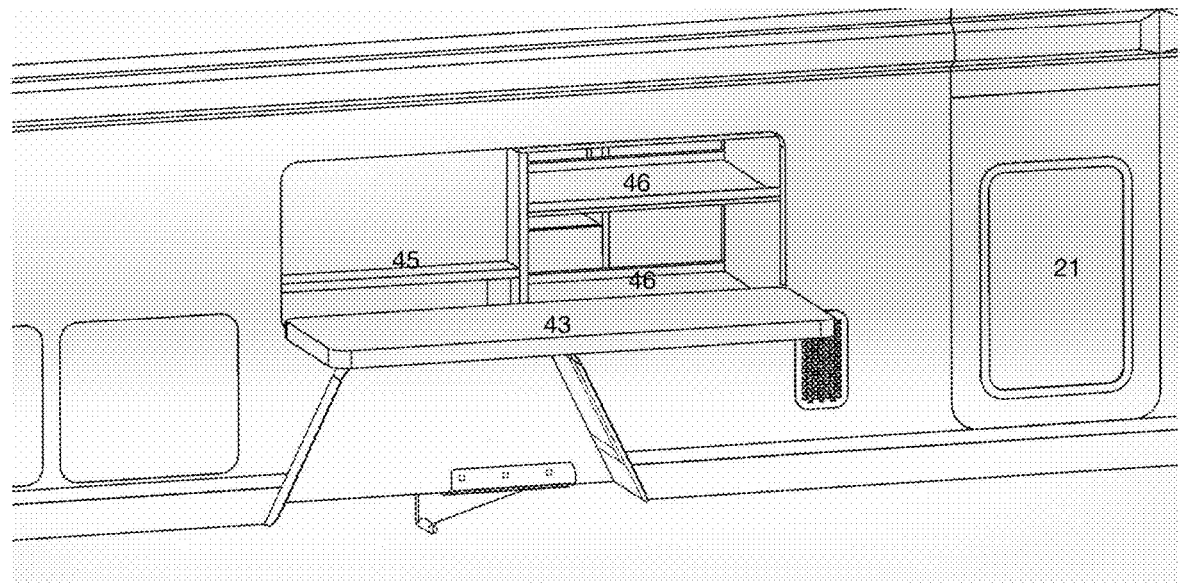
FIG. 12A portrays an example of the dual-access kitchen from the exterior side. This figure shows the dual-access kitchen, its shelves, and its height with respect to the interior shelves and the exterior arm-level.
Figure 12B:
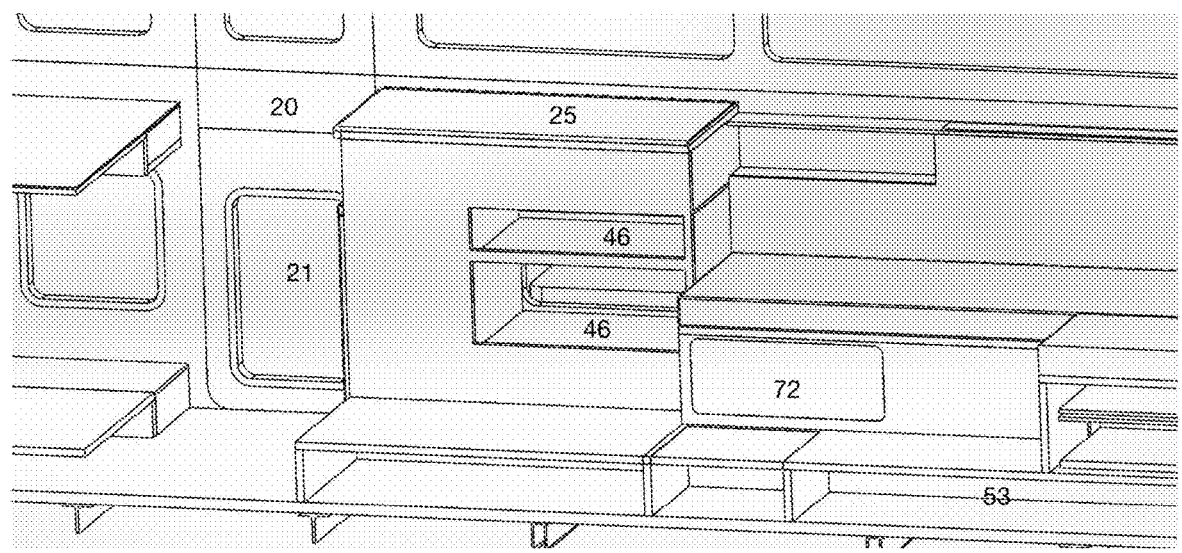
FIG. 12B portrays an example of the dual-access kitchen from the interior side. This figure shows the dual-access kitchen and its elements from the interior of the trailer, showing the lower level shelves designed to be at the right level with the exterior kitchen.

FIGS. 12A & 12B portray the indoor kitchenette area from both an exterior view and an interior view. The indoor kitchenette 25, further referred to as the dual-access kitchen, has dual-access elements that can be used from both inside and outside the trailer. This allows for dual-accessibility to the shelves and pantry areas 46. The features that the dual-access kitchen 25 provides are many. The dual-access kitchen 25 contains dual-sided access points that are convenient for both sides. There will be shared compartments 45 & 46 between the indoor kitchen and outside area. There will be drawers and compartment doors that close off the compartment from the elements, but fundamentally, the compartment will be shared to carry the dual-access theme of the trailer. Meaning that from the interior, one only needs to bend over normally to reach the storage compartments 45 & 46 which are at approximately knee height. And on the outside, one is at approximately arm-level with the same storage compartment 45 & 46 mentioned earlier. This gives the user two of everything without actually having two of everything. This feature increases convenience in that one does not have to keep moving from inside to outside to access a heavily-used compartment. The area that is shared between both exterior and interior serves as, but not limited to, a pantry or utensil compartment. This means that the outdoor kitchen 42 can utilize storage compartments 45 & 46 in the dual-access kitchen 25 as a pantry, utensil cabinet, spices compartment, etc.

The panel 25 that closes the shared compartment can be folded down to be used as a countertop. In another embodiment, however, panel 25 can be used as a shade for the used area. In another embodiment, the panel 25 is also allowed to move, rotate, or flip to serve any needs necessary. The panel 25 also maintains the ability to be locked and secured from the interior or exterior of the trailer. Another embodiment of this invention are dual-access appliances, providing the ability to use refrigerators, stoves, ovens, microwaves, dishwashers, drawers, cupboards, utensil drawers, and wet bars from a dual-access vantage point as well. The panel 25 may be comprised of any combination of: USB ports, Qiwireless charging stations, wired charging stations, or an electric stove surface for cooking.

The novelty is an indoor and outdoor kitchen arrangement for a recreational vehicle attached internally to an exterior wall with an opening. This opening is capable of being sealed by an exterior panel, therefore allowing the panel to be shared by the interior and exterior of the trailer. The shared area is deemed dual accessible, wherein dual accessibility implies that the area is accessible from indoor the recreational vehicle or from outside. The panel is also described to be simultaneously usable, where said portions of the kitchen can be used from the interior and exterior of the trailer at the same time. Lastly, the dual-access kitchen allows usability from different ground levels. With one ground level being the interior of the trailer and the other being from the exterior, the users of the dual-access kitchen can use the same compartments from different heights.

Figure 13:
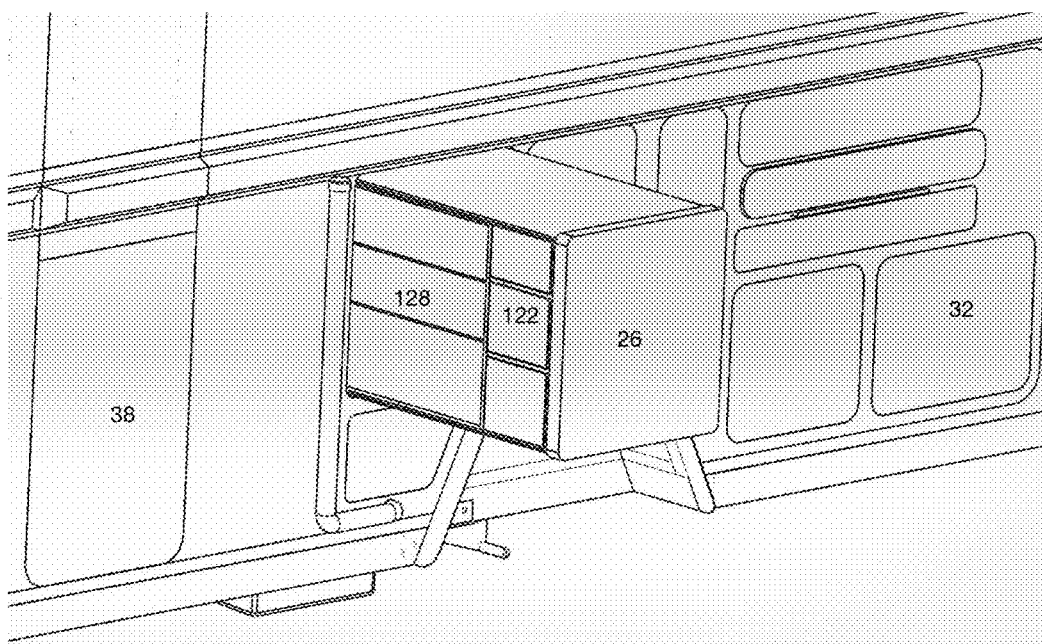
FIG. 13 shows an example of the closet in an exploded point of view from the exterior. This figure shows the closet in its pulled out form, showing its components and their placement with regards to the interior of the trailer.

FIG. 13 portrays the closet in an exploded version pulled out from the trailer. The novel closet 26 is engineered to be accessible from both outside and inside the trailer, regardless of the trailer's collapsed or uncollapsed version. The closet 26 as a whole operates like a drawer. When pulled out from the exterior, stocking is made easier rather than digging into the closet to stock clothes from the interior. The closet contains shelves, racks, and drawers 128 for multi-situational use for all amenities. The closet also shares additional compartments 122 with the bathroom. The closet shares an adjacent wall with the bathroom. This allows three compartments 122 to be accessible to the bathroom from the structure of the closet. When pulled out, these compartments 122 are placed in the common wall between the bathroom and the closet 26, allowing the compartments to be pulled out in times of restocking, allowing toiletries to be stocked more conveniently.

Figure 14:
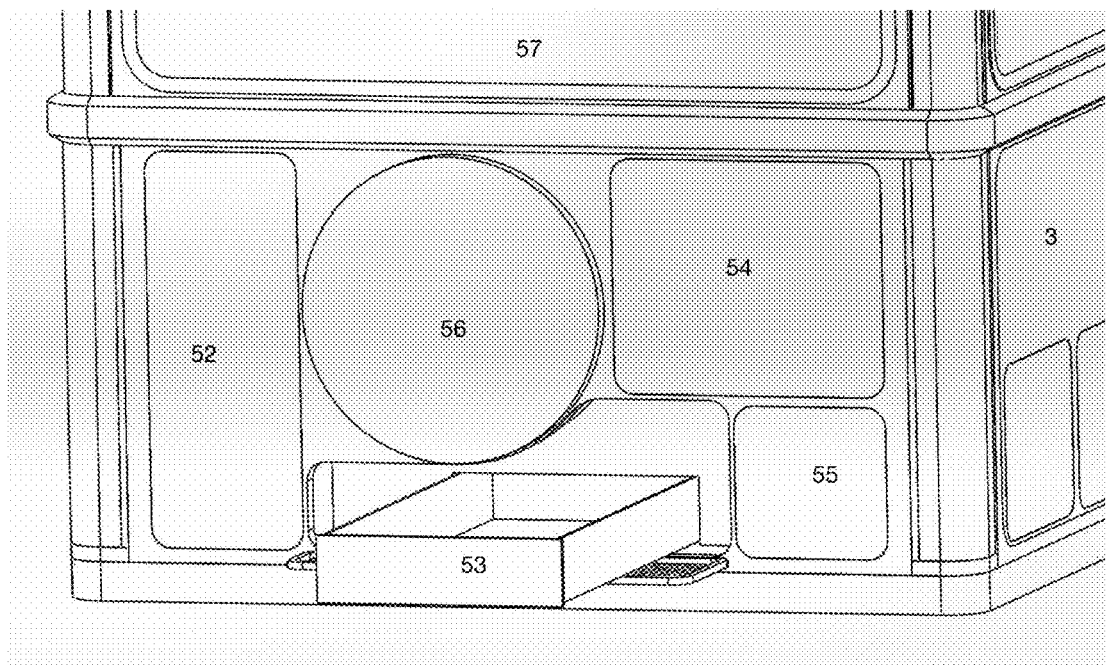
FIG. 14 shows an example of the rear of the trailer with the bottom drawer pulled out. This figure shows the drawer pulled out, showing the placement of the drawer in the rear and its depth from the rear.

FIG. 14 portrays the rear bottom wall 5 of the trailer with some but not all complications. The back of the trailer contains many storage compartments that can include but not limited to a hunting safebox, a spare tire, an air compressor compartment, as well as some other miscellaneous storage compartments 52, 54, 55, & 56. The bottom compartment 53 spans the rear bottom wall 5 of the trailer, creating an easy, accessible, and large drawer.

Figure 15:
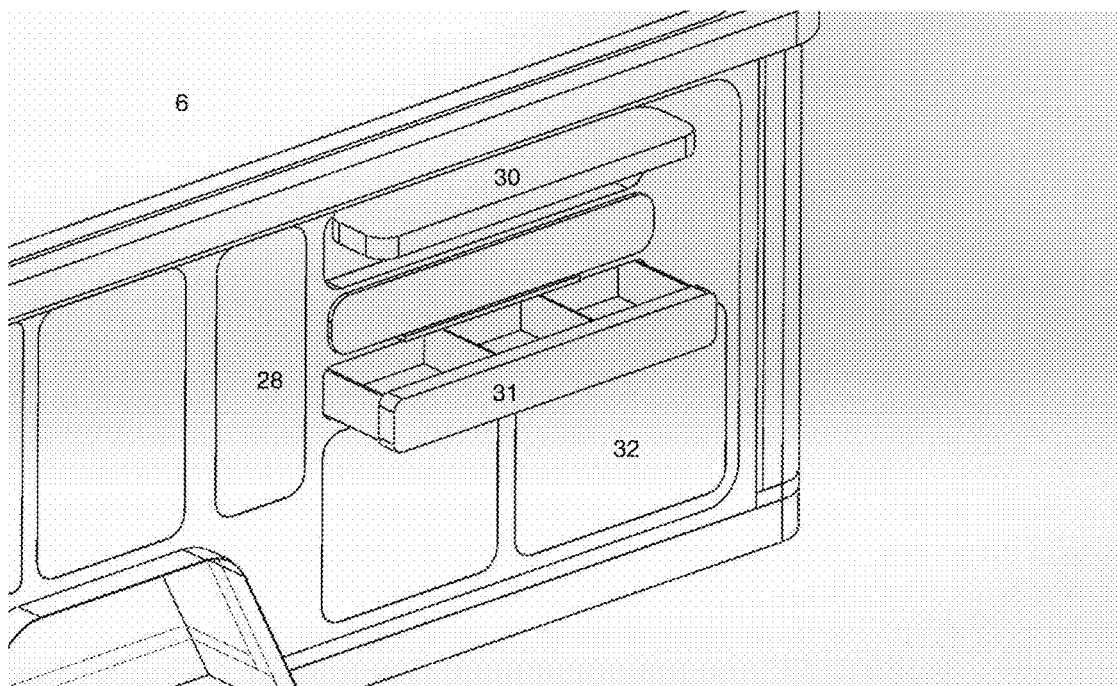
FIG. 15 shows an example of the dual-access bar area of the trailer. This figure shows the elements of the bar and the different drawers and tabletops that are a part of the bar area.

FIG. 15 portrays the bar area with its uses. The bar area has a foldable countertop where service can be made from both inside and outside the trailer. The bar area also features a drawer 31 where cups and drinks can be housed. This drawer is accessible from both inside and outside the trailer. This component carries the theme of easy storage and easy dual-access to the amenities provided by the travel trailer.

FIGS. 16A, 16B, 16C, & 16D portray the trailer in a cross-sectioned point of view portraying the interior of the travel trailer. In order for the trailer to fold into its collapsed version, the walls separating the bathroom area in the trailer need to be fold in order to clear the clearance line. In order to clear the tolerance, the upper half of the wall structure needs to move into a tolerant position to be folded with the upper walls. In an effort to avoid any structural mishaps, the novel idea of our bathroom walls was introduced. The bathroom comprises anyone or any combination of: a sink, a toilet, an electrical outlet that is energized only when the shower head is not on, a shower head stored in said lower bathroom assembly and movable to said upper bathroom assembly, a floor for receiving and disposing of water, a mirror, or a cupboard or drawer.

Figure 16A:
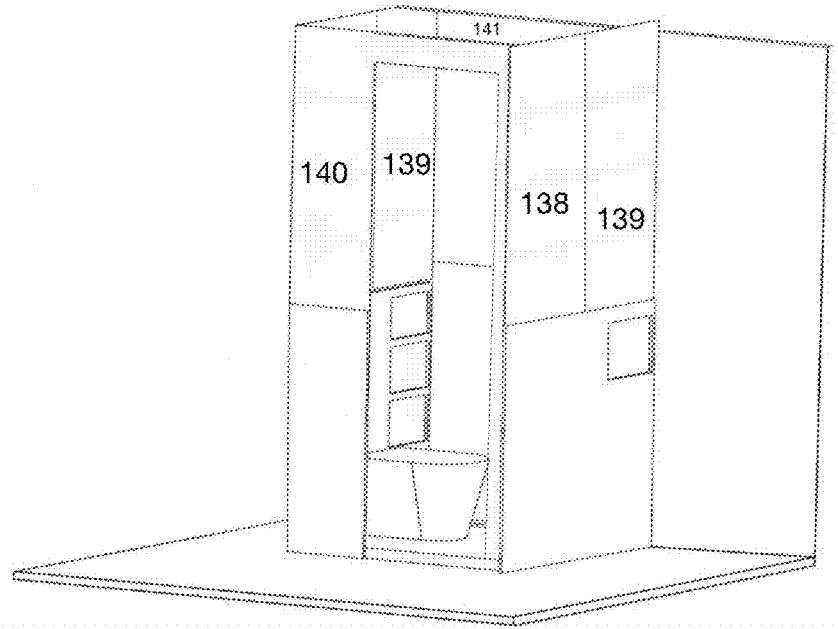
FIG. 16A shows an example of the bathroom in a holistic point of view. This figure is aimed to show the bathroom in an unobstructed view to highlight the size and general features of the bathroom.
Figure 16B:
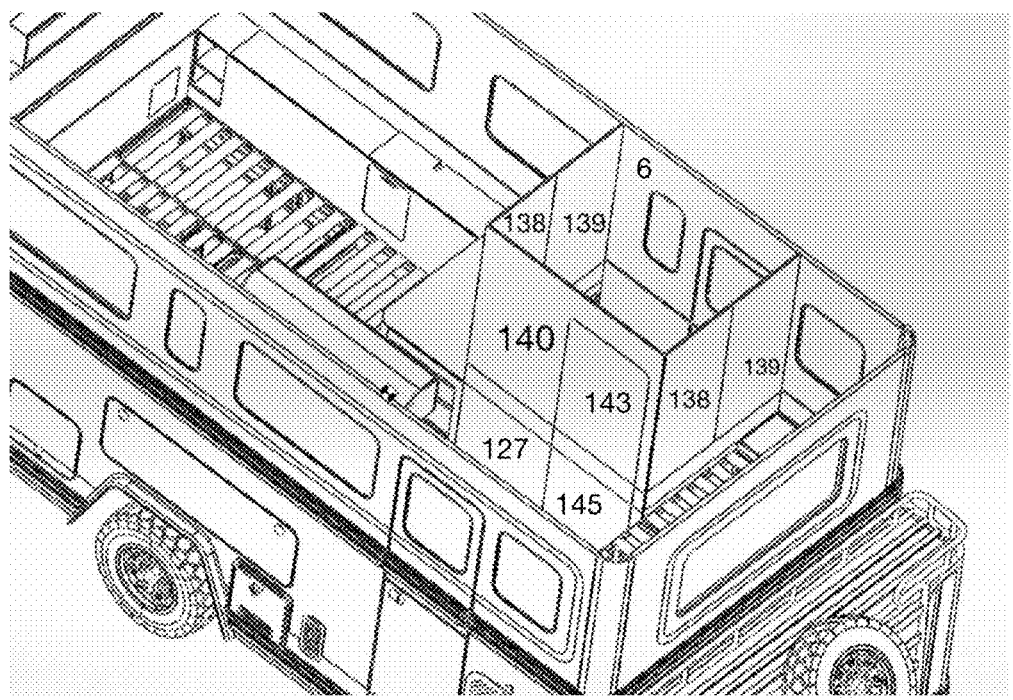
FIG. 16B shows an example of the bathroom with its upper walls in its unfolded position. The purpose of this figure is to show the bathroom with the rest of the trailer surrounding to proportionate the bathroom. The walls are also in the full uncollapsed position.
Figure 16C:
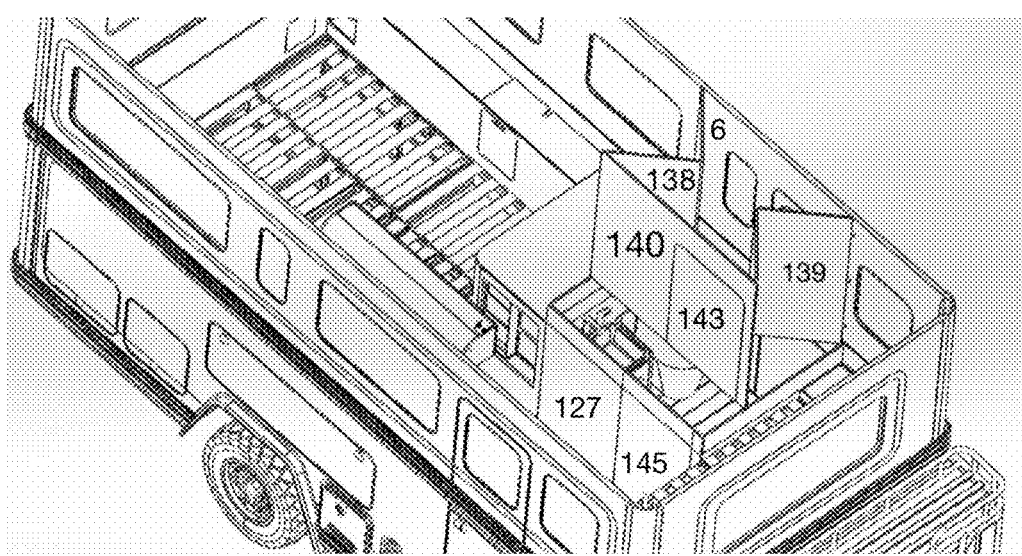
FIG. 16C shows an example of the bathroom with its upper walls in the middle position between folded and unfolded. The purpose of this figure is to show the walls in the middle position between uncollapsed and collapsed forms.
Figure 16D:
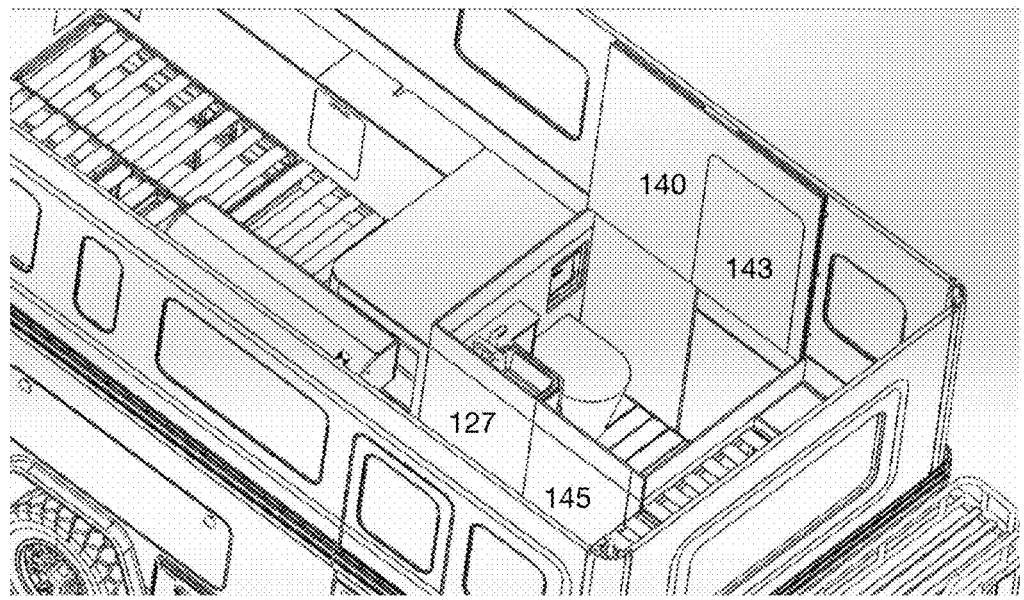
FIG. 16D shows an example of the bathroom with its upper walls in the folded position and ready to collapse. The purpose of this figure is to show the walls in a flat position showing the walls in their ready-to-fold position.

The side walls 138 & 139 are connected together using a hinge. When the trailer is in the process of collapsing, FIG. 16C portrays the novel structure in its midway position where the side walls 138 & 139 fold into each other at the hinge as the front panel 140 meets the side wall 6. FIG. 16D portrays the structure in its final position before collapsing the trailer where 138 & 139 are concealed between the front panel 140 and side wall 6 in a completely folded position. The upper half of the wall structure is folded into the side wall 6 and magnetically attached to the side wall 6, which then folds into the horizontal position. The upper half of the bathroom walls fold into each other adjacent to the upper wall 6. After folding into the wall, the whole wall 6 and upper bathroom assembly fold down together when collapsing the trailer. The upper bathroom assembly comprises a foldable structural element having multiple panels that are arranged in series with a first edge and a final edge, with a height from said first extent to said ceiling. These multiple panels are consecutively hinged together and said first edge and said final edge are hinged to said rear wall, wherein at least one panel of said multiple panels has an upper door aligned with said front lower wall's lower door.

Figure 17A:
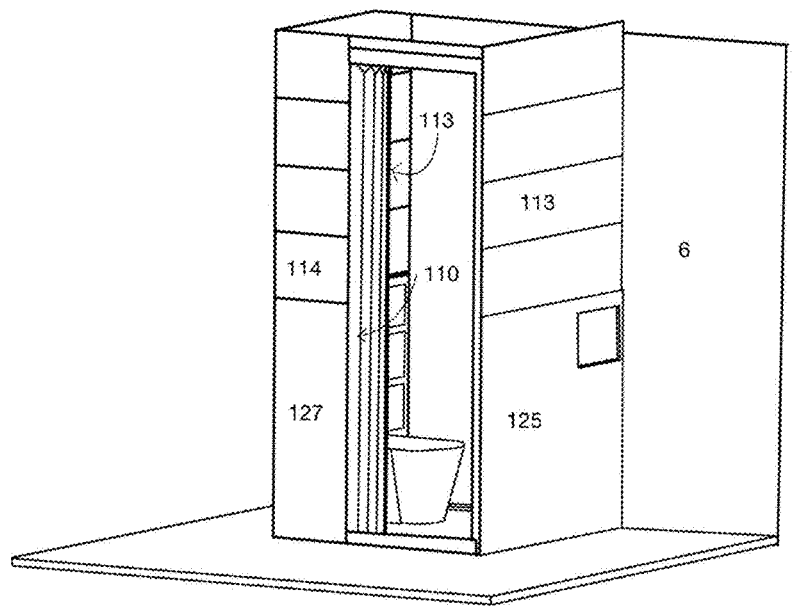
FIG. 17A portrays an embodiment of the bathroom. The purpose of this figure is to show the different layout of an embodiment of the bathroom and to show its components.
Figure 17B:
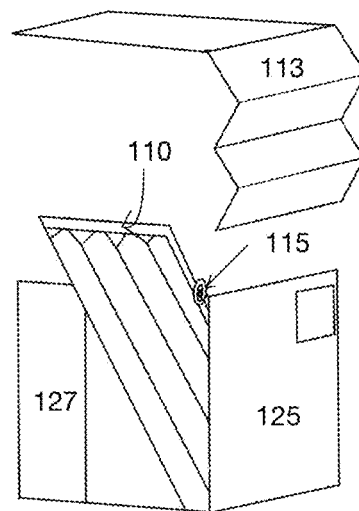
FIG. 17B portrays the second embodiment of the bathroom while it is in the process of collapsing down to storage. The figure shows the walls as they fold upwards and the door as it is swivels into its storage position.

Another embodiment of the bathroom configuration is explained below and is shown in FIGS. 17A & 17B. The novel bathroom assembly contains many innovative features such as contractible walls and a stowable accordion door. The contractible walls 113 & 114 are magnetically fixed together but are permanently fixed to the ceiling. The contractible walls are comprised of multiple, stackable rectangular flaps 113 & 114 that conjoin with the bottom wall 125, when unfolded. The door of the bathroom assembly 110 is an accordion door in order to use the least amount of surface area while being stored away. The accordion door 110 is fixed at an axised hinge 115 at approximately the midline. The door revolves clockwise at a hinge 115 positioned just under the midline of the top bunk. The door revolves clockwise and tucks next to the top bunk in order to accommodate the folding nature of the trailer.

Figure 18A:
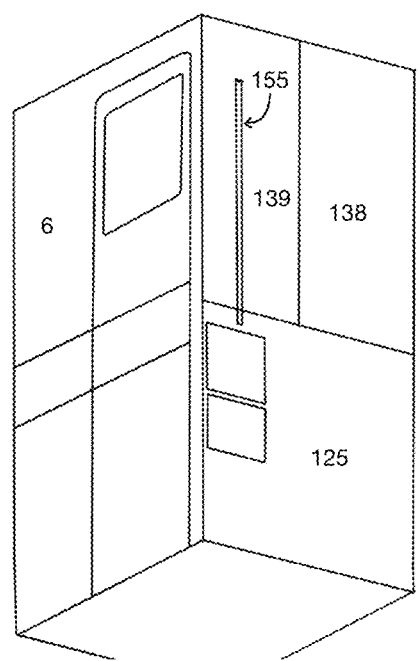
FIG. 18A portrays the interior of the bathroom with the intent to show the shower mechanism. The figure shows a track that spans from the end of the bottom panel to the end of the top panel.
Figure 18B:
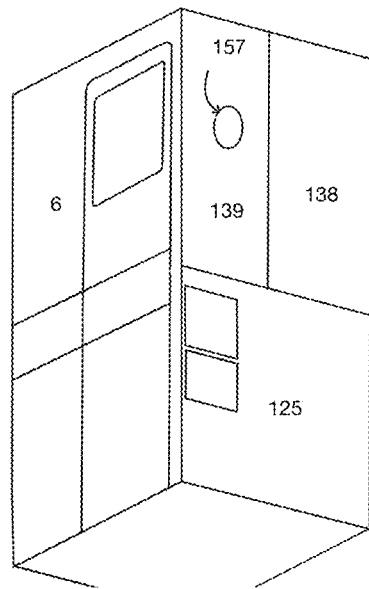
FIG. 18B portrays the interior of the bathroom with the intent to show another embodiment of the shower mechanism. The purpose of the figure is to highlight the different components for the novelty.
Figure 18C:
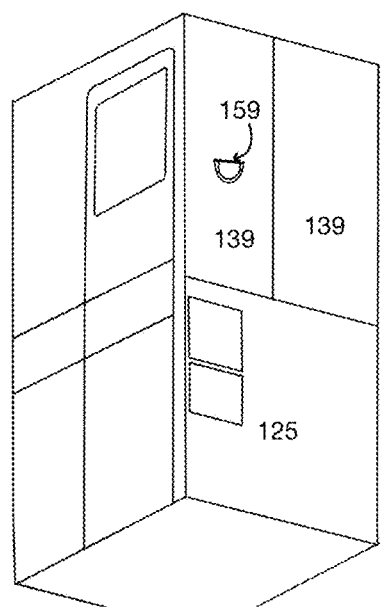
FIG. 18C portrays the interior of the bathroom with the intent to show another embodiment of the shower mechanism. The purpose of the figure is to highlight the different components for the novelty.

Another novelty present within the bathroom is the way that the shower head and shower utilities are positioned in its storage and usage positions. FIGS. 18A, 18B, and 18C portray various embodiments of the shower walls and how the shower head can be used at the top panel 139 and stored at the bottom panel 125. The preferred embodiment, shown in FIG. 18A, is an automatic track, continuing from from the bottom panel 125 to the top panel 139. The shower head, connected on the track, travels automatically up the track when the bathroom walls fold out into their usage position.

Another embodiment of the shower head, presented in FIG. 18B, is a magnetic pad screwed into the top panel 139. The shower head is hooked onto the bottom panel 125 and has a magnetic back. When the bathroom walls are unfolded, the shower head is transferred manually to connect magnetically to the magnetic pad on the top panel 139.

Another embodiment of the shower head, presented in FIG. 18C, is a foldable hook attached to the upper panel 139 where the shower head can attach to it. The shower head is hooked into a hook on the bottom panel 125 and is transferred to the top panel 139 when the bathroom walls are in their unfolded position.

Figure 19:
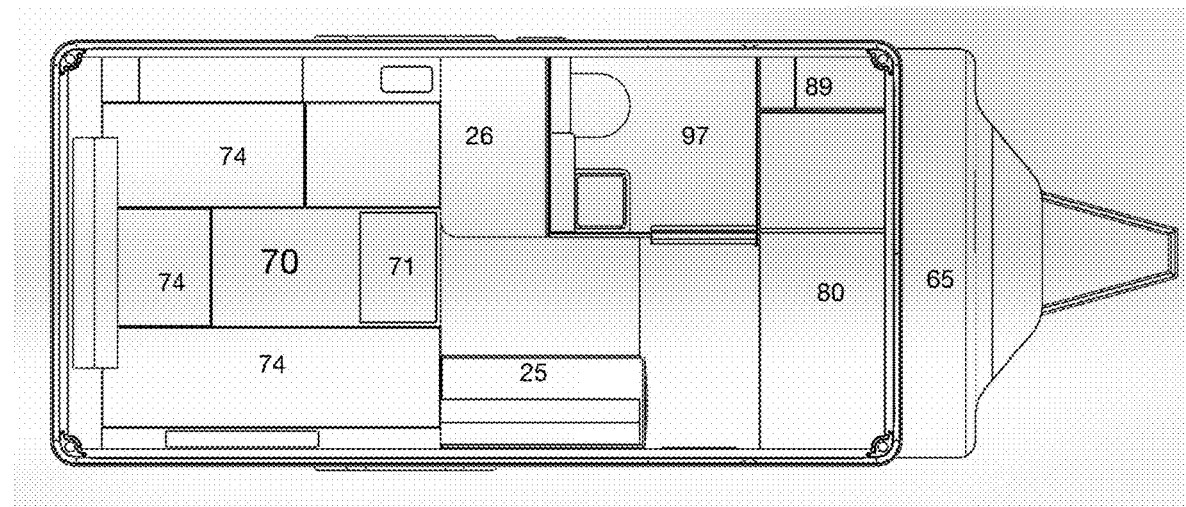
FIG. 19 shows an example of the floor plan from a birds-eye view. The purpose of this figure is to show the trailer's floor plan and general offerings in one picture.
Figure 20:
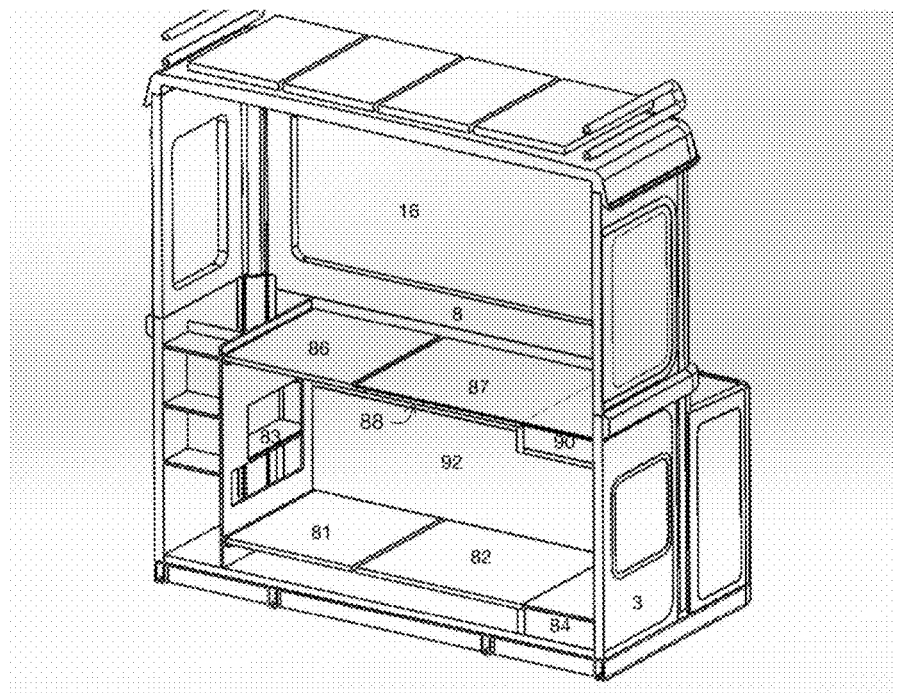
FIG. 20 shows an example of the bunk beds in the sleep configuration from an interior point of view. The purpose of this figure is to show the bunk beds in an unobstructed view while the trailer is in its uncollapsed form.
Figure 21:
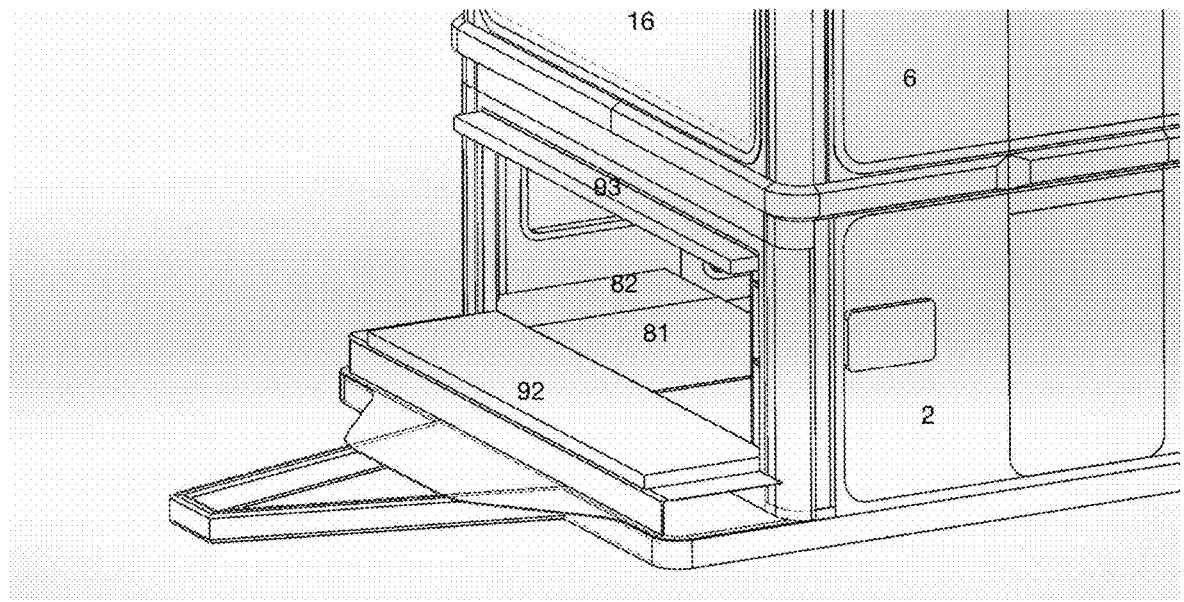
FIG. 21 shows an example of the bottom bunk in its expanded configuration from an exterior point of view with some interfering components removed for clarity. The purpose of this figure is to show the second half of the bottom bunk in its expanded form. However, the interfering object, the front cabinet of the trailer, is removed for clarity.

FIG. 19 portrays the trailer in a cross-section point of view, showcasing the interior. The bunk beds operate with dual functionalities. The bunk beds can operate as regular bunk beds with two, approximately twin-sized beds. The bunk beds can also accommodate an approximately full-twin configuration. To accomplish this, the common wall 92 between the bottom bunk and the outer tongue storage knocks over. FIG. 21 shows the common wall knocked down and portrays the bottom bunk in its horizontal position completing the twin bed into a full bed. The common wall is comprised of two pieces 92 & 93 helping achieve the knockdown feature. The two panels act as a horizontal door with a threshold and locking mechanism. The top flap 93 is mostly stationary but rotates to help lock the remainder of the wall 92 into place. The larger piece of the wall 92 folds down to fit flush with the bottom bunk surfaces 81 & 82, therefore creating an approximately full size bed.

Figure 22:
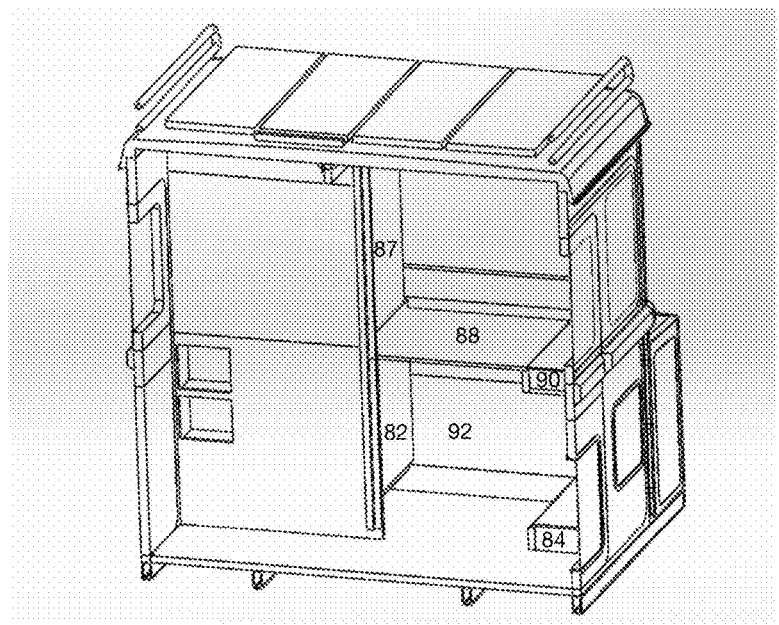
FIG. 22 shows an example of the bunk beds in the work configuration from an interior point of view. The purpose of this figure is to illustrate the multifunctional aspect of the bunk beds to show the desktop configuration of the bunk area.
Figure 23:
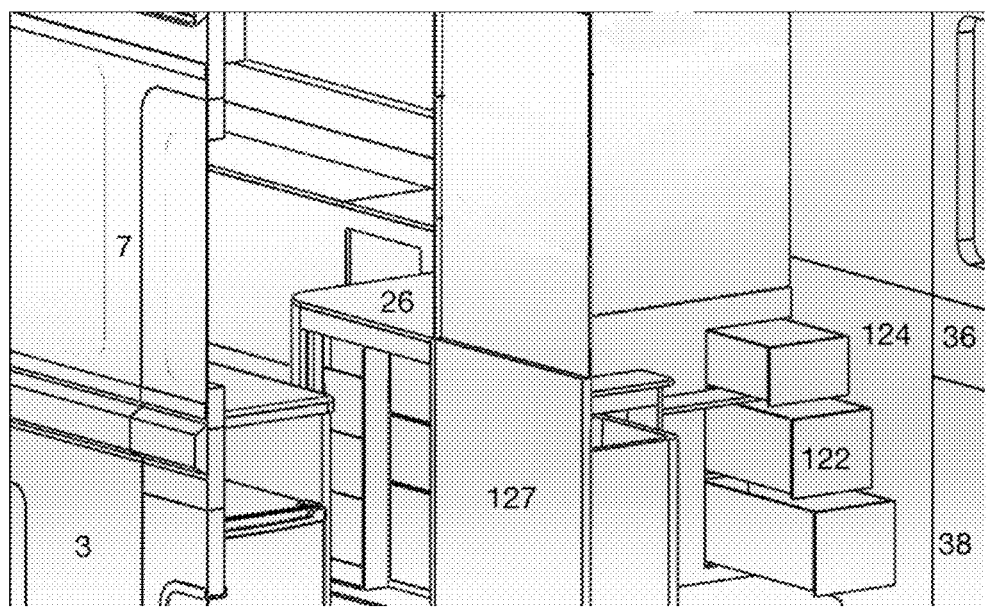
FIG. 23 shows an example of the bathroom storage compartments in an exploded point of view. The purpose of this figure is to show the three compartments that are shared with the side of the closet that are found in the adjacent wall to the bathroom.

FIG. 22 portrays the bunk beds configured in a desk manner. The top bunk is separated into three pieces. The left half of the top bunk 86 remains stationary regardless. The bottom half of the right side 86 is also a stationary piece. The top flap of the right side 87 is the mobile component. It operates on a hinge to lift upwards, moving all bedding to the interior side of the bunk, leaving the bottom piece 88 to become a desktop. As for the bottom bunk, it is only two pieces 81 & 82. The right flap 82 moves in the same manner as top bunk flap 87. It rotates upwards leaving a gap for legroom under the desktop. There are two desk-style drawers 84 & 90 to increase the utility of the multifunctional desk space. Each bunk bed also contains a set of storage compartments 83 & 89 behind the headrest area as portrayed in FIG. 19.

Figure 24:
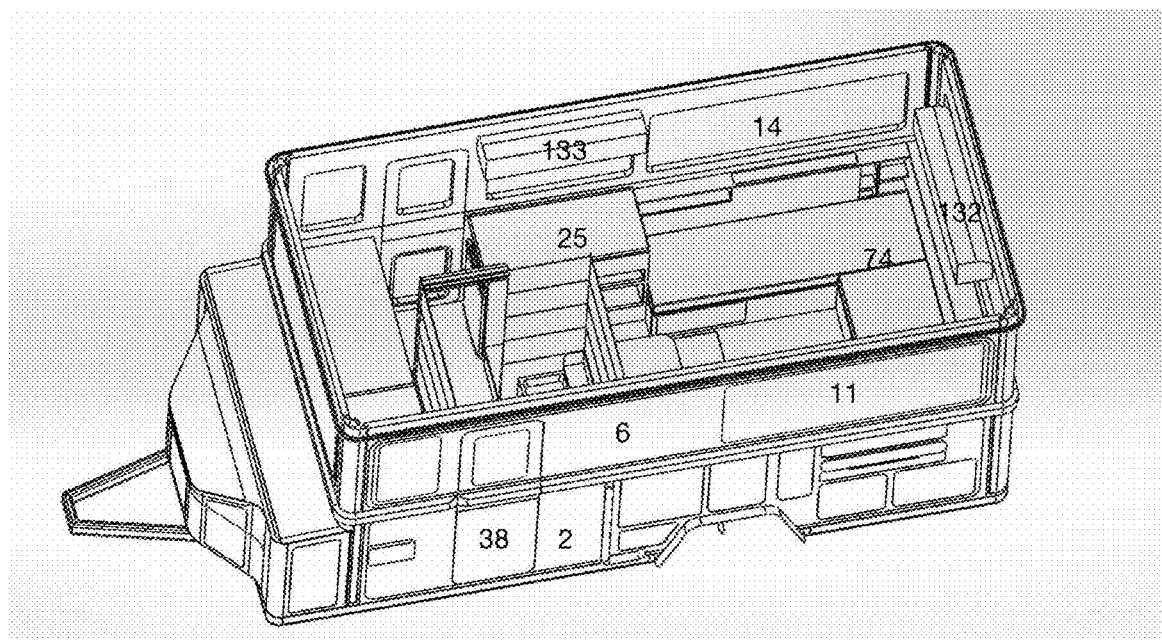
FIG. 24 depicts an example of the trailer in a cross-section portraying the interior and its features. This figure is aimed at providing a holistic perspective of the interior with most of the interior complications.
Figure 27A:
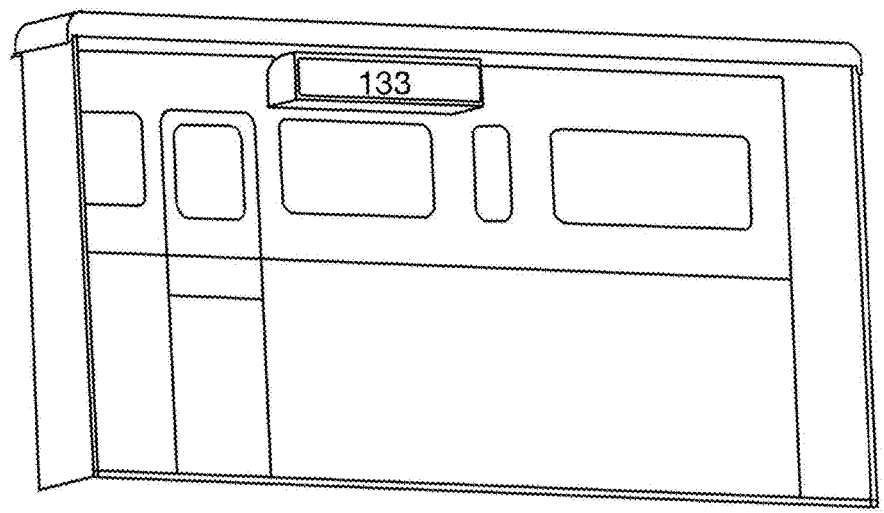
FIG. 27A depicts the novel overhead compartments. The purpose of this figure is to show their technology and design.
Figure 27B:
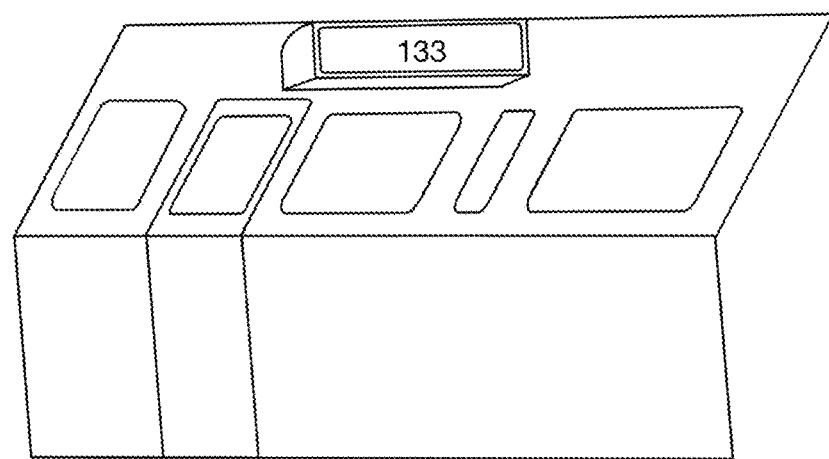
FIG. 27B depicts the novel overhead compartments while the walls are in the process of folding. The purpose of this figure is to show the technology of the compartment's versatile orientation, staying upright at all times.

FIGS. 24, 27A, & 27B portrays the interior with its multi-storage amenities. There is a novelty present within the interior, being that there are storage compartments 133 attached to the walls that fold down. These compartments are hinged on a dual, ball-bearing axis in which when the wall folds down, the compartment remains in its upright orientation. This is useful so that nothing topples, falls, or spills within the compartments when the walls are folding. This is novel because, previously, there have been no examples of compartments fixed to a folding panel, due to the stored items moving when the panel folds.

Figure 25:
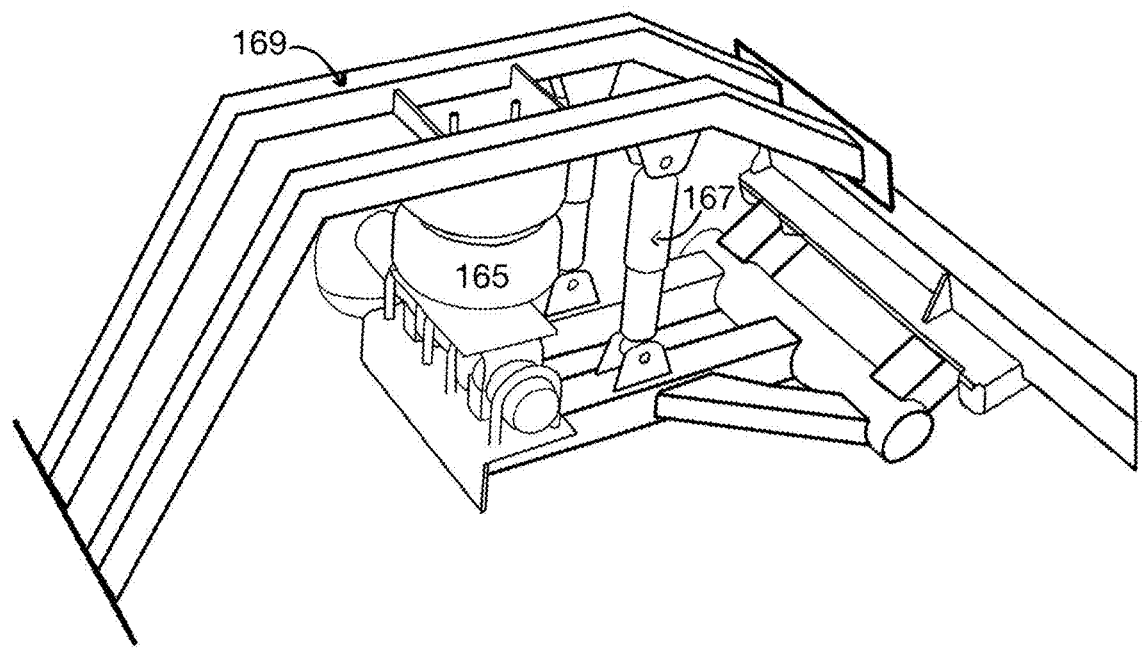
FIG. 25 depicts an illustration of the suspension used and its features. The purpose of this figure is to highlight the aspects of an air suspension that is off-road capable simultaneously.

FIG. 25 portrays the chassis and suspension characteristics of the trailer. The novelty presented in this figure is the use of an off-road-capable air suspension in a collapsible, hard-sided trailer. It allows for the trailer to lower in order to clear height clearances as well as fit in standard-sized garages. This also allows for the trailer to lower at high speed to reduce drag and increase fuel economy. It also raises in order to have better ground clearance and off-road capability. The suspension utilizes the combination of convoluted air bags 165 and traditional suspension shocks 167 to provide a harmonious suspension setup.

Figure 26A:
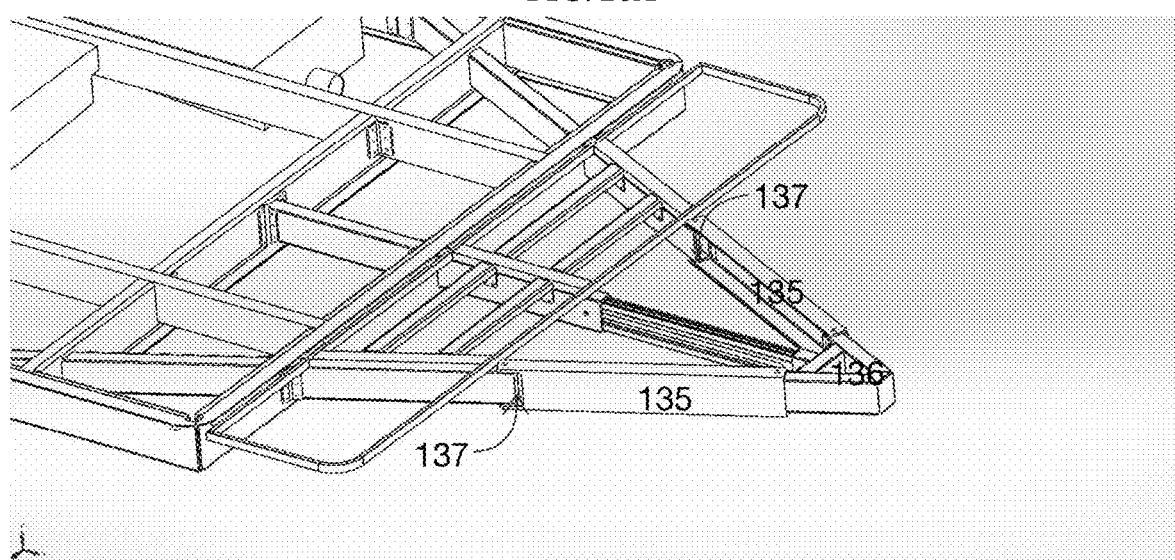
FIG. 26A depicts an illustration of the tongue and its features in its driving position. This figure is aimed to show the different versions of the tongue frame and the mechanism in which the different versions are reached.
Figure 26B:
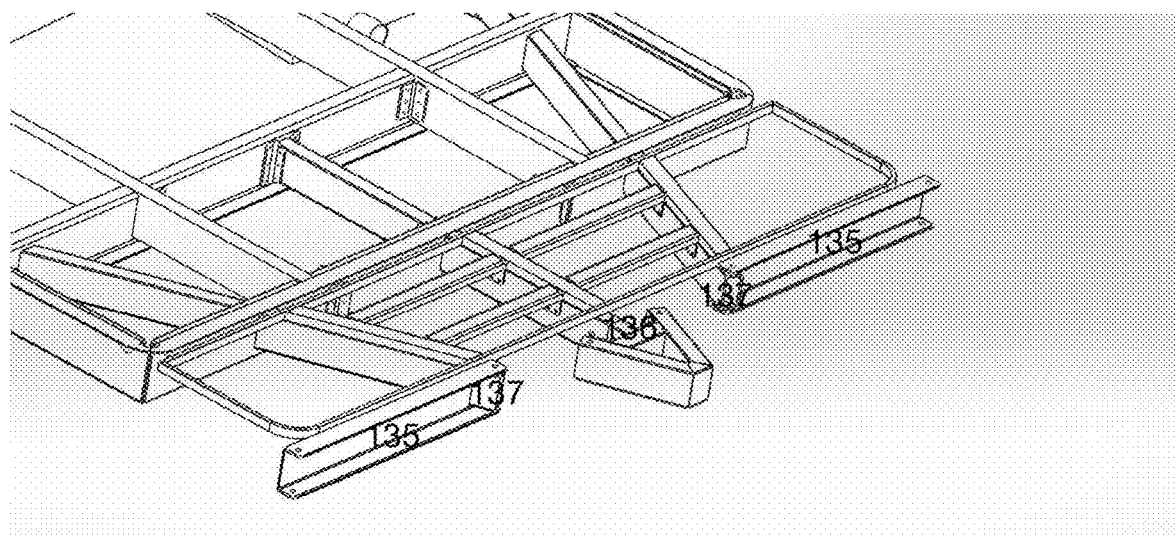
FIG. 26B depicts an illustration of the tongue and its features in its storage position. The figure is aimed to show the storage version of the tongue frame where the frame is pulled back for maximum length clearance to ensure garageability.

FIG. 26A portrays the novel tongue of the trailer. The words, tongue, a-frame, and coupler are to be used interchangeably. The tongue is designed to retract in times of storage and protrude in times of usage. The tongue measures the tolerance needed to allow the trailer to be compact and fit in smaller spaces. The tongue features hinges 137. There are hinges on both the left and right angled pieces 135 of the tongue. The pieces telescope outward to be adjacent with the front of the trailer as portrayed in FIG. 26B. The left and right angled pieces 135 meet the center pole and connect to the center pole with pins and latches to secure the connection during mobility. The center pole 136 of the tongue retracts inward to a designated position in the trailer's chassis. The storage configuration as shown in FIG. 26B allows garageability and compactability without losing structural rigidity during usage. This creates more clearance for the garageability of the trailer in an average-length garage. By folding the tongue, the trailer has the capacity to increase cabin space while maintaining the trailer's garageability. This means that instead of cutting into cabin space to maintain garageability, the cabin can remain the same size and the space can be conserved through the retractable tongue.

What is claimed is:

1. A tongue assembly used for towing a trailer, said tongue assembly having a collapsed configuration and an extended configuration, wherein said trailer comprises a chassis, and wherein said tongue assembly comprises:
    three rectangular tubular frame elements forming a triangle having:
        a first frame element being the base of said triangle, attached to said chassis, and having a first end and a second end;
        a second frame element being a leg of said triangle further comprising
            a first segment joined to said first frame element's first end,
            a second segment hingedly joined at one end to said second frame element's first segment; and
        a third frame element being the other leg of said triangle further comprising
            a first segment joined to said first frame element's second end,
            a second segment hingedly joined at one end to said third frame element's first segment; and
    a center pole element being primarily rectangular and bisecting said triangle, the center pole element comprising:
        a proximal segment attached to said first frame element and
        a distal segment configured to be slidable within said proximal segment, comprising a coupler at its distal end configured to receive said second frame element's second segment and said third frame element's second segment;
    wherein said tongue assembly is in its collapsed configuration when
        said distal segment is retracted within said proximal segment;
        said second frame element's second segment is folded against its first segment; and
        said third frame element's second segment is folded against its first segment;
    wherein said tongue assembly is in its extended configuration when
        said distal segment is drawn out from said proximal segment;
        said second frame element's second segment is folded against said coupler; and
        said third frame element's second segment is folded against said coupler;
    wherein said tongue can be retracted from its extended configuration to its collapsed configuration to reduce storage space; and
    wherein said second and third frame element's second segment is releasably secured to said coupler by pins or latches when said tongue assembly is in its extended configuration.

2. The tongue assembly of claim 1, wherein said center pole's proximal segment further comprises a flange containing one or more openings to allow one or more rectangular tubular support elements to pass through with one end of said support element being attached to said second frame element while the opposing end of said support element being attached to said third frame element.

3. The tongue assembly of claim 1, further comprising a rectangular tubular structure atop of said frame elements being
    the width of said first frame element,
    the length of said second frame element and said third frame element first segments,
    to support a platform suitable for securing cargo.

4. The tongue assembly of claim 1, wherein the triangle formed by said three rectangular tubular frame elements is one of an equilateral triangle and an isosceles triangle.

5. The tongue assembly of claim 1, wherein the tongue assembly being retractable from its extended configuration to its collapsed configuration to reduce storage space further enables said trailer to have increased interior cabin space while maintaining storability of the trailer in a garage.

6. The tongue assembly of claim 1, wherein the tongue assembly being retractable from its extended configuration to its collapsed configuration to reduce storage space further enables more space saving as compared to a foldable tongue, wherein said retractable tongue saves storage space more than a foldable tongue due to the thickness of the tongue.

7. The tongue assembly of claim 1, wherein said coupler is configured to be hitched to a towing vehicle.

8. The tongue assembly of claim 1, wherein said second and third frame element's second segment is releasably secured to its respective first segment by pins or latches when said tongue assembly is in its collapsed configuration.

9. The tongue assembly of claim 1, wherein the position of said distal segment within said proximal segment is fixed by pins or latches.

\* \* \* \* \*